(12) United States Patent  
Kawanishi

(10) Patent No.: US 8,247,710 B2  
(45) Date of Patent: Aug. 21, 2012

(54) COMBINATION WEIGHER INCLUDING A PLURALITY OF COMBINATION HOPPER GROUPS

(75) Inventor: Shozo Kawanishi, Nishinomiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 443 days.

(21) Appl. No.: 12/374,605

(22) PCT Filed: Jul. 20, 2007

(86) PCT No.: PCT/JP2007/064351  
§ 371 (c)(1),  
(2), (4) Date: Nov. 23, 2009

(87) PCT Pub. No.: WO2008/010574  
PCT Pub. Date: Jan. 24, 2008

(65) Prior Publication Data  
US 2010/0096192 A1    Apr. 22, 2010

(30) Foreign Application Priority Data  
Jul. 21, 2006    (JP) .................................. 2006-199333

(51) Int. Cl.  
*G01G 19/387*    (2006.01)

(52) U.S. Cl. ..................................... 177/25.18

(58) Field of Classification Search ................. 177/25.18  
See application file for complete search history.

(56) References Cited

U.S. PATENT DOCUMENTS

| | | | | |
|---|---|---|---|---|
| 4,399,880 A | * | 8/1983 | Konishi | ............................ 177/1 |
| 4,676,326 A | * | 6/1987 | Konishi | ............................ 177/1 |
| 7,566,837 B2 | * | 7/2009 | Kawanishi et al. | ........ 177/25.18 |
| 8,115,118 B2 | * | 2/2012 | Kawanishi | ................. 177/25.18 |
| 8,119,935 B2 | * | 2/2012 | Kawanishi | ................. 177/25.18 |

FOREIGN PATENT DOCUMENTS

| | | |
|---|---|---|
| EP | 0 219 347 A2 | 4/1987 |
| JP | 57-125322 | 8/1982 |
| JP | 62-091819 | 4/1987 |
| JP | 62-091819 A | 4/1987 |

(Continued)

OTHER PUBLICATIONS

Machine translation of JP 2006-153541 A from the AIPN (Japanses Patent Office) website (Nov. 1, 2011).*

(Continued)

*Primary Examiner* — Randy W Gibson  
(74) *Attorney, Agent, or Firm* — Marshall, Gerstein & Borun LLP

(57) ABSTRACT

A combination weigher includes a plurality of upper collecting chutes disposed below weighing hoppers, a plurality of upper collecting hoppers provided at discharge outlets of the upper collecting chutes, a lower collecting chute provided below the upper collecting hoppers, a lower collecting hopper provided at a discharge outlet of the lower collecting chute, and a control unit which repeatedly performs a combination process to determine one discharge combination of the weighing hoppers, a discharge process for discharging the objects from the weighing hoppers onto the upper collecting chutes, and a discharge process for discharging the objects simultaneously from the upper collecting hoppers, and a discharge process for discharging the objects from the lower collecting hopper.

25 Claims, 10 Drawing Sheets

FOREIGN PATENT DOCUMENTS

| | | |
|---|---|---|
| JP | 1-32926 | 7/1989 |
| JP | 08-001395 | 1/1996 |
| JP | 60-155914 | 8/2005 |
| JP | 2006-153541 | 6/2006 |
| RU | 2229103 C2 | 5/2004 |
| RU | 47 516 U1 | 8/2005 |
| WO | WO-2006/033290 | 3/2006 |
| WO | WO-2006057215 A1 | 6/2006 |

OTHER PUBLICATIONS

Decision on Grant for Russian Patent Application No. 2009106063/28(008128), dated Mar. 9, 2010.

International Search Report for PCT/JP2007/064351, mailed Nov. 6, 2007.

Extended European Search Report for European Patent Application No. 07791088.3, dated Feb. 28, 2012.

* cited by examiner (a)                                      (b)

(c)                                      (d)

COMBINATION WEIGHER INCLUDING A PLURALITY OF COMBINATION HOPPER GROUPS

TECHNICAL FIELD

The present invention relates to a combination weigher which feeds to a packaging machine or the like, objects to be weighed which have been weighed.

BACKGROUND ART

Objects to be weighed, such as detergents and confectionery, which have been weighed to have specified weight by a combination weigher, are typically packaged by a packaging machine (see for example, a patent document 1).

The conventional combination weigher which weighs the objects to be weighed includes, for example, a plurality of weighing hoppers for weighing weights of the objects to be weighed, and is configured to perform combination calculation in such a manner that weights of the objects to be weighed held in these weighing hoppers are combined to determine a combination of weighing hoppers holding the objects to be weighed whose combined weight is equal to or closest to a combination target weight, and to cause the weighing hoppers corresponding to the combination to discharge the objects to be weighed to a packaging machine.

FIG. 10 shows a schematic configuration of such a conventional combination weigher which weighs the objects to be weighed. The combination weigher is configured such that a control unit 30 controls the operation of the entire combination weigher and performs combination calculation. The combination weigher is constructed in such a manner that a center base body (body) 15 is disposed at a center of the combination weigher, and a dispersion feeder 1 having a conical shape is mounted to an upper part of the center base body 5 to radially disperse by vibration objects to be weighed supplied from an external supplying device. Around the dispersion feeder 1, linear feeders 2 are provided to transport by vibration the objects to be weighed which have been sent from the dispersion feeder 1 into respective feeding hoppers 3. The plurality of feeding hoppers 3 and weighing hoppers 4 are disposed below the linear feeders 2 and are arranged in a circular shape in such a manner that each feeding hopper 3 and each weighing hopper 4 correspond to the associated one of the linear feeders 2. The feeding hopper 3 receives the objects to be weighed which have been sent from the linear feeder 2, and opens its gate to feed the objects to be weighed to the weighing hopper 4 located therebelow when the weighing hopper 4 becomes empty. The weighing hopper 4 is attached with a weight sensor 41 such as a load cell. The weight sensor 41 measures the weight of the objects to be weighed inside the weighing hopper 4. The control unit 30 performs combination calculation to select a combination (discharge combination) made up of hoppers which will discharge the objects to be weighed, from among the plurality of weighing hoppers 4. The weighing hoppers 4 corresponding to the discharge combination discharge the objects to be weighed onto a collecting chute 6. A collecting hopper 7 is provided at a discharge outlet of a bottom part of the collecting chute 6. The objects to be weighed which have been discharged from the weighing hoppers 4 slide down on the collecting chute 6 and are held in the collecting hopper 7. Thereafter, the objects to be weighed are discharged from the collecting hopper 7 and are sent out to a packaging machine which is not shown. While making package bags, the packaging machine charges the objects to be weighed which have been discharged from the combination weigher into the package bags and packages them.

Patent document 1: Japanese Examined Patent Application Publication No. Hei. 8-1395

DISCLOSURE OF THE INVENTION

Problems to be Solved by the Invention

In order to increase a productivity (total number of times the objects to be weighed are discharged to the packaging machine), the above described conventional combination weigher carries out a high-speed operation in which the combination weigher operates at, for example, a maximum speed. However, depending on the characteristic of the objects to be weighed, such as bulky (bulk density is low) objects to be weighed, or sticky objects to be weighed, a batch length of the objects to be weighed which slide down on the collecting chute 6 increases. Consequently, a time (hereinafter referred to as a batch time of the objects to be weighed on the collecting chute 6) increases, which elapses from when a head part of a batch of the objects to be weighed which have been discharged simultaneously from the plurality of weighing hoppers 4 to the collecting chute 6 arrives at the discharge outlet (collecting hopper 7) of the collecting chute 6 until a tail part of the batch of the objects to be weighed arrives at the discharge outlet (collecting hopper 7) of the collecting chute 6.

In order to maintain a desired weighing precision and improve a weighing speed, the combination weigher is configured to carry out a double shift operation, a triple shift operation, etc by increasing the number of weighing hoppers 4 which participate in combination calculation. In a large-sized combination weigher having a large arrangement shape (circular shape in FIG. 10) of the weighing hoppers 4, which is formed by increasing the number of the weighing hoppers 4 as described above, the size of the collecting chute 6 is large and a transfer distance of the objects to be weighed on the collecting chute 6 increases, so that a batch length of the objects to be weighed which slide down on the collecting chute 6 increases and a correspondingly, a batch time of the objects to be weighed on the collecting chute 6 increases, depending on the characteristic of the objects to be weighed.

When the batch time of the objects to be weighed on the collecting chute is longer than an assumed time (allowable batch time), a distance between the objects to be weighed which have been discharged from weighing hoppers 4 selected for a previous discharge combination and the objects to be weighed which have been discharged from weighing hoppers 4 selected for a subsequent discharge combination on the collecting chute 6 is insufficient, or they are mixed on the collecting chute 6, unless the operation speed of the combination weigher is set low. This makes it impossible to carry out a normal operation.

The same problems arise in a combination weigher in which weighing hoppers 4 are arranged in a linear shape as well as in the combination weigher in which the weighing hoppers 4 are arranged in a circular shape.

The present invention has been made to solve the above described problems, and an object of the present invention is to provide a combination weigher which is capable of reducing a batch time of objects to be weighed on a collecting chute and of carrying out a high-speed operation irrespective of the characteristic of the objects to be weighed, etc.

Means for Solving the Problem

In order to achieve the above described objective, a combination weigher comprises a plurality of combination hopper groups each including a plurality of combination hoppers which are fed with objects to be weighed; a plurality of upper collecting chutes which are disposed below the combination hopper groups to respectively correspond to the combination hopper groups and are configured to gather the objects to be weighed which have been discharged from the combination hoppers and to discharge the objects to be weighed from discharge outlets at bottom parts thereof; a plurality of upper collecting hoppers which are provided at the discharge outlets of the upper collecting chutes to respectively correspond to the upper collecting chutes and are configured to hold the objects to be weighed which have been discharged from the discharge outlets of the upper collecting chutes and then to discharge the objects to be weighed; and a control means configured to repeatedly perform a combination process in which combination calculation is performed based on weights of the objects to be weighed which are held in the combination hoppers belonging to the plurality of combination hopper groups to determine a combination of the combination hoppers holding the objects to be weighed whose total weight falls within a predetermined weight range and determine the combination as a discharge combination, a first discharge process in which the combination hoppers belonging to the discharge combination determined in the combination process discharge the objects to be weighed, and a second discharge process in which the plurality of upper collecting hoppers discharge the objects to be weighed simultaneously, to discharge the objects to be weighed which have been discharged from the combination hoppers and are held in the upper collecting hoppers.

In accordance with such a configuration, by providing the plurality of upper collecting chutes provided with the upper collecting hoppers at the discharge outlets thereof, in place of the conventional one collecting chute, a vertical dimension of each upper collecting chute, or the like can be reduced, making it possible to reduce a transfer distance and a transfer time of the objects to be weighed sliding down on the upper collecting chutes. The objects to be weighed which have been discharged from the combination hoppers to the upper collecting chutes can be gathered in the upper collecting hoppers in a state where a batch length of thereof is small, and can be discharged from the upper collecting hoppers in a state of being lumped together.

For this reason, irrespective of the characteristics of the objects to be weighed, the size of the arrangement shape of the combination hoppers, etc, the batch time of the objects to be weighed on each upper collecting chute can be reduced, and thus, the high-speed operation can be carried out. In addition, since the transfer distance of the objects to be weighed sliding down on the upper collecting chute is short, a maximum speed of the objects to be weighed sliding down is suppressed to a low one, so that impact generated when the objects to be weighed collide against each other or generated due to the collision of the objects to be weighed against the inner wall of the upper collecting hopper which occurs when the objects to be weighed enter the upper collecting hopper is small. As a result, damage to the objects to be weighed can be prevented.

The combination weigher may be configured to feed, to the same packaging machine feed inlet, the objects to be weighed which have been discharged from all of the upper collecting hoppers.

The combination weigher may further comprise a lower collecting hopper which is disposed below the upper collecting hoppers, and is configured to hold the objects to be weighed which have been discharged from all of the upper collecting hoppers and to then discharge the objects to be weighed to the packaging machine feed inlet.

In this case, for example, the upper collecting hoppers may be configured to directly feed the objects to be weighed to the lower collecting hopper.

The combination weigher may further comprise a plurality of intermediate collecting hoppers which are disposed below the upper collecting hoppers and are configured to hold the objects to be weighed which have been discharged from respective of plurality of upper collecting hoppers and to then discharge the objects to be weighed; and a lower collecting hopper which is provided below the intermediate collecting hoppers and is configured to hold the objects to be weighed which have been discharged from all of the intermediate collecting hoppers and to then discharge the objects to be weighed to the packaging machine feed inlet.

In this case, for example, the upper collecting hoppers may be configured to directly feed the objects to be weighed to the intermediate collecting hoppers and the intermediate collecting hoppers may be configured to directly feed the objects to be weighed to the lower collecting hopper.

The combination weigher may further comprise a collecting discharge means which gathers the objects to be weighed which have been discharged from the plurality of upper collecting hoppers and to discharge the objects to be weighed.

The collecting discharge means may include a lower collecting chute which is disposed below the upper collecting hoppers and is configured to gather the objects to be weighed which have been discharged from all of the upper collecting hoppers and to discharge the objects to be weighed from a discharge outlet at a bottom part thereof to a packaging machine feed inlet. This configuration is referred to as a two-stage chute configuration.

In accordance with such a configuration, by providing the plurality of upper collecting chutes provided with the upper collecting hoppers at the discharge outlets thereof and the lower collecting chute, in place of the conventional one collecting chute, a vertical dimension of each of the upper and lower collecting chutes, or the like can be reduced, making it possible to reduce a transfer distance and a transfer time of the objects to be weighed sliding down on each of the upper and lower collecting chutes. The objects to be weighed which have been discharged from the combination hoppers to the upper collecting chutes can be gathered in the upper collecting hoppers in a state where a batch length of thereof is small, and can be discharged from the upper collecting hoppers to the lower collecting chute in a state of being lumped together. In addition, the objects to be weighed can be discharged from the discharge outlet of the lower collecting chute to the packaging machine feed inlet in a state where a batch length of the objects to be weighed which have been discharged to the lower collecting chute is small. For this reason, irrespective of the characteristics of the objects to be weighed, the size of the arrangement shape of the combination hoppers, etc, the batch time of the objects to be weighed on each of upper and lower collecting chutes can be reduced, and the high-speed operation can be carried out. In addition, since the transfer distance of the objects to be weighed sliding down on the upper collecting chute and the transfer distance of the objects to be weighed sliding down on the lower collecting chute are short, a maximum speed of the objects to be weighed sliding down is suppressed to a low one, so that impact generated when the objects to be weighed collide against each other or generated due to the collision of the objects to be weighed against the inner wall of the upper collecting hopper which occurs when the objects to be weighed enter the upper collecting hopper is small. As a result, damage to the objects to be weighed can be prevented.

The collecting discharge means may include a plurality of intermediate collecting chutes which are disposed below the upper collecting hoppers and are configured to gather the objects to be weighed which have been discharged from respective of the plurality of upper collecting hoppers and to discharge the objects to be weighed from discharge outlets at bottom parts thereof; a plurality of intermediate collecting hoppers which are respectively provided at the discharge outlets of the intermediate collecting chutes and are configured to hold the objects to be weighed which have been discharged from the discharge outlets of the intermediate collecting chutes and to then discharge the objects to be weighed; and a lower collecting chute which is disposed below the intermediate collecting hoppers and is configured to gather the objects to be weighed which have been discharged from all of the intermediate collecting hoppers and to discharge the objects to be weighed from a discharge outlet at a bottom part thereof to a packaging machine feed inlet. This configuration is referred to as three-stage chute configuration.

In such a configuration, by providing the plurality of upper collecting chutes provided with the upper collecting hoppers at the discharge outlets thereof, the plurality of intermediate collecting chutes provided with the intermediate collecting hoppers at the discharge outlets thereof, and the lower collecting chute, in place of the conventional one collecting chute, a vertical dimension of each of the upper, intermediate and lower collecting chutes, or the like can be reduced, making it possible to reduce a transfer distance and a transfer time of the objects to be weighed sliding down on the upper, intermediate and lower collecting chutes. The objects to be weighed which have been discharged from the combination hoppers to the upper collecting chutes can be gathered in the upper collecting hoppers in a state where a batch length of thereof is small, and can be discharged from the upper collecting hoppers to the intermediate collecting chutes in a state of being lumped together. In addition, the objects to be weighed can be gathered in the intermediate collecting hoppers in a state where a batch length of the objects to be weighed which have been discharged to the intermediate collecting chutes is small, and can be discharged from the intermediate collecting hoppers to the lower collecting chute in a state of being lumped together. Further, the objects to be weighed can be discharged from the discharge outlet of the lower collecting chute to the packaging machine feed inlet in a state where a batch length of the objects to be weighed which have been discharged to the lower collecting chute is small. For this reason, irrespective of the characteristics of the objects to be weighed, the size of the arrangement shape of the combination hoppers, etc, the batch time of the objects to be weighed on each of upper, intermediate and lower collecting chutes can be reduced, and the high-speed operation can be carried out. In addition, since the transfer distance of the objects to be weighed sliding down on the upper collecting chute, the transfer distance sliding down on the inter mediate collecting chute, and the transfer distance of the objects to be weighed sliding down on the lower collecting chute are short, a maximum speed of the objects to be weighed sliding down is suppressed to a low one, so that impact generated when the objects to be weighed collide against each other or generated due to the collision of the objects to be weighed against the inner walls of the upper and intermediate collecting hoppers which occurs when the objects to be weighed enter the upper and intermediate collecting hoppers is made small. As a result, damage to the objects to be weighed can be prevented.

The collecting discharge means may further include a lower collecting hopper which is provided at a discharge outlet of the lower collecting chute and is configured to hold the objects to be weighed which have been discharged from the discharge outlet of the lower collecting chute and to then discharge the objects to be weighed.

In accordance with such a configuration, the objects to be weighed which have been discharged to the lower collecting chute and has a certain batch length (length) can be gathered once in the lower collecting hopper, and can be discharged from the lower collecting hopper in a state of being lumped together.

The collecting discharge means may include second to p-th (p: integer of four or larger) plural-stage collecting chutes which are disposed below a first-stage collecting chute consisting of the upper collecting chutes, and collecting hoppers which are respectively provided at discharge outlets of bottom parts of second to (p−1)-th stage collecting chutes and are configured to hold the objects to be weighed which have been discharged from discharge outlets at bottom parts of the collecting chutes and to then discharge the objects to be weighed; wherein a q-th (q: integer in a range of 2 to p) stage collecting chute may be configured to gather the objects to be weighed which have been discharged from the collecting hoppers provided at discharge outlets of the (q−1)-th stage plural collecting chutes and to discharge the objects to be weighed from a discharge outlet at a bottom part thereof; the combination weigher being configured to feed, into a packaging machine feed inlet, the objects to be weighed which have been discharged from a discharge outlet at a bottom part of the p-th stage collecting chute. This configuration is referred to as a multi-stage configuration.

In accordance with such a configuration, by providing the plurality of upper (first-stage) collecting chutes provided with the upper collecting hoppers at the discharge outlets thereof, the second to (p−1)-th stage collecting chutes provided with the collecting hoppers at the discharge outlets thereof, and the p-th stage collecting chute, in place of the conventional one collecting chute, a vertical dimension of each collecting chute, or the like can be reduced, making it possible to reduce a transfer distance and a transfer time of the objects to be weighed sliding down on each collecting chute. The objects to be weighed which have been discharged to the first to (p−1)-th stage collecting chutes can be gathered in the collecting hoppers provided at the collecting chutes in a state where a batch length of thereof is small, and can be discharged from the collecting hoppers to a subsequent-stage collecting chute in a state of being lumped together. The objects to be weighed which have been discharged to the p-th stage, i.e., lowermost stage collecting chute can be discharged from the discharge outlet thereof to the packaging machine feed inlet in a state where a batch length of the objects to be weighed is small. For this reason, irrespective of the characteristics of the objects to be weighed, the size of the arrangement shape of the combination hoppers, etc, the batch time of the objects to be weighed on each collecting chute can be reduced, and the high-speed operation can be carried out. In addition, since the transfer distance of the objects to be weighed sliding down on each collecting chute is short, a maximum speed of the objects to be weighed sliding down is suppressed to a low one, so that impact generated when the objects to be weighed collide against each other or generated due to the collision of the objects to be weighed against the inner walls of the collecting hoppers which occurs when entering the collecting hoppers is small. As a result, damage to the objects to be weighed can be prevented.

The collecting discharge means may further include a collecting hopper provided at a discharge outlet of the p-th stage collecting chute, and may be configured to hold the objects to be weighed which have been discharged from the p-th stage collecting chute and to then discharge the objects to be weighed.

In accordance with such a configuration, the objects to be weighed can be discharged from the collecting hopper provided at the discharge outlet of the p-th stage collecting chute to the packaging machine feed inlet in a state of being lumped together.

The upper collecting hoppers may be configured to discharge the objects to be weighed selectively in a first direction or in a second direction. The collecting discharge means may includes a first lower collecting chute which is disposed below the upper collecting hoppers and is configured to gather the objects to be weighed which have been discharged from all of the upper collecting hoppers in the first direction and to discharge the objects to be weighed from a discharge outlet at a bottom part thereof to a first packaging machine feed inlet; and a second lower collecting chute which is disposed below the upper collecting hoppers and is configured to gather the objects to be weighed which have been discharged from all of the upper collecting hoppers in the second direction and to discharge the objects to be weighed from a discharge outlet at a bottom part thereof to a second packaging machine feed inlet; and wherein the control means may be configured to cause the plurality of upper collecting hoppers to discharge the objects to be weighed in the first direction and in the second direction alternately in the second discharge process performed repeatedly.

In accordance with such a configuration, the objects to be weighed can be discharged alternately to the first and second packaging machine feed inlets. In addition, the advantages similar to those of the two-stage chute configuration are achieved.

The upper collecting hoppers may be configured to discharge the objects to be weighed selectively in a first direction or in a second direction; the collecting discharge means may include a plurality of first intermediate collecting chutes which are disposed below the upper collecting hoppers and are configured to gather the objects to be weighed which have been discharged from respective of the plurality of upper collecting hoppers in the first direction and to discharge the objects to be weighed from discharge outlets at bottom parts thereof; a plurality of second intermediate collecting chutes which are disposed below the upper collecting hoppers and are configured to gather the objects to be weighed which have been discharged from respective of the plurality of upper collecting hoppers in the second direction and to discharge the objects to be weighed from discharge outlets at bottom parts thereof; a plurality of first intermediate collecting hoppers which are respectively provided at discharge outlets of the first intermediate collecting chutes, and are configured to hold the objects to be weighed which have been discharged from the discharge outlets of the first intermediate collecting chutes, and to then discharge the objects to be weighed; a plurality of second intermediate collecting hoppers which are respectively provided at discharge outlets of the second intermediate collecting chutes, and are configured to hold the objects to be weighed which have been discharged from the discharge outlets of the second intermediate collecting chutes, and to then discharge the objects to be weighed; a first lower collecting chute which is disposed below the first intermediate collecting hoppers and is configured to gather the objects to be weighed which have been discharged from all of the first intermediate collecting hoppers and to discharge the objects to be weighed from a discharge outlet at a bottom part thereof to a first packaging machine feed inlet; and a second lower collecting chute which is disposed below the second intermediate collecting hoppers and is configured to gather the objects to be weighed which have been discharged from all of the second intermediate collecting hoppers and to discharge the objects to be weighed from a discharge outlet at a bottom part thereof to a second packaging machine feed inlet; and wherein the control means may be configured to cause all of the upper collecting hoppers to discharge the objects to be weighed in the first direction and in the second direction alternately in the second discharge process performed repeatedly.

In accordance with such a configuration, the objects to be weighed can be discharged alternately to the first and second packaging machine feed inlets. In addition, the advantages similar to those of the three-stage chute configuration are achieved.

The collecting discharge means may include a plurality of intermediate collecting chutes which are disposed below the upper collecting hoppers and are configured to gather the objects to be weighed which have been discharged from respective of the plurality of upper collecting hoppers and to discharge the objects to be weighed from discharge outlets at bottom parts thereof; a plurality of intermediate collecting hoppers which are respectively provided at discharge outlets of the intermediate collecting chutes and are configured to hold the objects to be weighed which have been discharged from the discharge outlets of the intermediate collecting hoppers and to then discharge the objects to be weighed selectively in a first direction or in a second direction; a first lower collecting chute which is disposed below the intermediate collecting hoppers and is configured to gather the objects to be weighed which have been discharged in the first direction from all of the intermediate collecting hoppers and to discharge the objects to be weighed from a discharge outlet at a bottom part thereof to a first packaging machine feed inlet; and a second lower collecting chute which is disposed below the intermediate collecting hoppers and is configured to gather the objects to be weighed which have been discharged in the second direction from all of the intermediate collecting hoppers and to discharge the objects to be weighed from a discharge outlet at a bottom part thereof to a second packaging machine feed inlet; and wherein the control means is configured to cause all of the intermediate collecting hoppers to discharge the objects to be weighed in the first direction and in the second direction alternately in the second discharge process repeatedly performed by the control means.

In accordance with such a configuration, the objects to be weighed can be discharged alternately to the first and second packaging machine feed inlets. In addition, the advantages similar to those of the three-stage chute configuration are achieved.

The collecting discharge means may further include two lower collecting hoppers which are provided at discharge outlets of the first and second lower collecting chutes and are configured to hold the objects to be weighed which have been discharged from the lower collecting chutes and to discharge the objects to be weighed.

In accordance with such a configuration, the objects to be weighed which have been discharged to the first and second lower collecting chutes and have a certain batch length (length) can be gathered once in the associated lower collecting hoppers, and can be discharged from the lower collecting hoppers in a state of being lumped together.

The upper collecting hoppers may be configured to selectively discharge the objects to be weighed in a first direction or in a second direction. The collecting discharge means may include second to p-th (p: integer of four or larger) plural-stage collecting chutes which are disposed below a first-stage collecting chute consisting of the upper collecting chutes, and collecting hoppers which are respectively provided at discharge outlets of bottom parts of second to (p−1)-th stage collecting chutes and are configured to hold the objects to be weighed which have been discharged from the discharge outlets at the bottom parts of the collecting chutes and to then discharge the objects to be weighed; wherein a q-th (q: integer in a range of 2 to p) stage collecting chute is configured to gather the objects to be weighed which have been discharged from the collecting hoppers provided at discharge outlets of the (q−1)-th stage plural collecting chutes and to discharge the objects to be weighed from a discharge outlet at a bottom part thereof; and the second to p-th stage collecting chutes are disposed to form a first discharge path through which the objects to be weighed which have been discharged in the first direction from the upper collecting hoppers are introduced to a first packaging machine feed inlet and a second discharge path through which the objects to be weighed which have been discharged in the second direction from the upper collecting hoppers are introduced to a second packaging machine feed inlet; and wherein the control means may be configured to cause the upper collecting hoppers to discharge the objects to be weighed in the first direction and in the second direction alternately in the second discharge process performed repeatedly.

In accordance with such a configuration, the objects to be weighed can be discharged alternately to the first and second packaging machine feed inlets. In addition, the advantages similar to those of the multi-stage chute configuration are achieved.

The collecting discharge means may include second to p-th (p: integer of four or larger) plural-stage collecting chutes which are disposed below a first-stage collecting chute consisting of the upper collecting chutes, and collecting hoppers which are provided at discharge outlets of bottom parts of second to (p−1)-th stage collecting chutes and are configured to hold the objects to be weighed which have been discharged from discharge outlets at bottom parts of the collecting chutes and to then discharge the objects to be weighed; wherein in the plural-stage collecting chutes, a q-th (q: integer of 2 to p) stage collecting chute is configured to gather the objects to be weighed which have been discharged from the collecting hoppers provided at discharge outlets of the (q−1)-th stage plural collecting chutes and to discharge the objects to be weighed from a discharge outlet at a bottom part thereof; a k-th (k: one integer in a range of 2 to p−1) stage collecting hopper provided at a discharge outlet of the k-th stage collecting chute is configured to discharge the objects to be weighed selectively in the first direction or in the second direction; and (k+1)-th to p-th stage collecting chutes are disposed to form a first discharge path through which the objects to be weighed which have been discharged in the first direction from the k-th stage collecting hopper are introduced to the first packaging machine feed inlet and a second discharge path through which the objects to be weighed which have been discharged in the second direction from the k-th collecting hopper are introduced to the second packaging machine feed inlet; and wherein the k-th stage collecting hopper may be configured to discharge the objects to be weighed in the first direction and in the second direction alternately in the second discharge process repeatedly performed by the control means.

In accordance with such a configuration, the objects to be weighed can be discharged alternately to the first and second packaging machine feed inlets. In addition, the advantages similar to those of the multi-stage chute configuration are achieved.

The collecting discharge means may further include a collecting hopper which is provided at a discharge outlet of the p-th stage collecting chute and is configured to discharge the objects to be weighed which have been discharged from the discharge outlet of the p-th stage collecting chute and to then discharge the objects to be weighed.

In accordance with such a configuration, the objects to be weighed can be discharged from the collecting hopper provided at the discharge outlet of the p-th stage collecting chute to the packaging machine feed inlet in a state of being lumped together.

The control means may be configured to perform the combination calculation based on weights of objects to be weighed which are held by combination hoppers which are not selected to form a discharge combination determined in a previous combination process, in a subsequent combination process in n (n: predetermined plural number) times of successive combination processes resulting from repeating the combination process.

In accordance with such a configuration, since the combination process can be performed n times within an actual weighing cycle time (e.g., one ideal weighing cycle time) and the objects to be weighed are discharged n times, a productivity within a specified time period can be improved. In the case of n=2, so-called a double shift operation takes place, while in the case of n=3, so-called a triple shift operation takes place.

The control means may be configured to determine the discharge combination such that the discharge combination includes combination hoppers belonging to at least two combination hopper groups.

In accordance with such a configuration, the objects to be weighed are discharged from the combination hoppers belonging to the discharge combination to at least two upper collecting chutes, and can be gathered in respective of at least two upper collecting hoppers. Therefore, the size (volume) of the upper collecting hopper can be reduced.

The control means may be configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; and wherein the upper collecting chutes may be configured so that a time taken from when the combination hoppers belonging to the discharge combination determined in the combination process start to discharge the objects to be weighed until all the objects to be weighed which have been discharged are fed to the upper collecting hoppers through the upper collecting chute is within a time which is 1.1 times as long as 1/k of the ideal weighing cycle time.

In accordance with such a configuration, the batch time of the objects to be weighed on the upper collecting chute can be suppressed to a time within a specified time. Once in every 1/k time of the ideal weighing cycle time, the combination hoppers selected to make up of the discharge combination discharge the objects to be weighed, all the objects to be weighed which have been discharged from the combination hoppers selected to make up of a discharge combination slide down on the upper collecting chute, and thereafter the combination hoppers selected to make up of a subsequent discharge combination discharge the objects to be weighed. Therefore, mixing between the objects to be weighed discharged previously and the objects to be weighed discharged subsequently on the upper collecting chute can be surely prevented, and the objects to be weighed can be discharged from the upper collecting hopper once in every 1/k time of the ideal weighing cycle time. For example, in the case of k=1, so-called a single shift operation takes place, in the case of k=2, so-called a double shift operation takes place, and in the case of n=3, so-called a triple shift operation takes place.

In the two-stage chute configuration, the collecting discharge means may further include a lower collecting hopper which is provided at a discharge outlet of the lower collecting chute and may be configured to hold the objects to be weighed which have been discharged from the discharge outlet of the lower collecting chute and to then discharge the objects to be weighed; wherein the control means may be configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein the upper collecting chutes are configured so that a time taken from when the combination hoppers belonging to the discharge combination determined in the combination process start to discharge the objects to be weighed until all the objects to be weighed which have been discharged are fed to the upper collecting hoppers through the upper collecting chutes is within a time which is 1.1 times as long as 1/k of the ideal weighing cycle time; and wherein the lower collecting chute may be configured so that a time taken from when the upper collecting hoppers start to discharge the objects to be weighed until all the objects to be weighed which have been discharged are fed to the lower collecting hopper through the lower collecting chute is within a time which is 1.1 times as long as 1/k of the ideal weighing cycle time.

In accordance with such a configuration, the batch time of the objects to be weighed on the upper and lower collecting chutes can be suppressed to a time within a specified time. Once in every 1/k time of the ideal weighing cycle time, the combination hoppers selected to make up of the discharge combination discharge the objects to be weighed, all the objects to be weighed which have been discharged from the combination hoppers selected to make up of a discharge combination slide down on the upper collecting chute, and thereafter the combination hoppers selected to make up of a subsequent discharge combination discharge the objects to be weighed. Therefore, mixing between the objects to be weighed discharged previously and the objects to be weighed discharged subsequently on the upper collecting chute can be surely prevented, and the objects to be weighed can be discharged from the upper collecting hopper once in every 1/k time of the ideal weighing cycle time. In addition, after all the objects to be weighed which have been discharged from the upper collecting hopper slide down on the lower collecting chute, the objects to be weighed are subsequently discharged from the upper collecting hopper. Therefore, mixing between the objects to be weighed discharged previously and the objects to be weighed discharged subsequently on the lower collecting chute can be surely prevented, and the objects to be weighed can be discharged from the lower collecting hopper once in every 1/k time of the ideal weighing cycle time. For example, in the case of k=1, so-called a single shift operation takes place, in the case of k=2, so-called a double shift operation takes place, and in the case of n=3, so-called a triple shift operation takes place.

In the three-stage chute configuration, the collecting discharge means may further include a lower collecting hopper which is provided at a discharge outlet of the lower collecting chute and is configured to hold the objects to be weighed which have been discharged from the discharge outlet of the lower collecting chute and to then discharge the objects to be weighed; wherein the control means may be configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein the upper collecting chutes may be configured so that a time taken from when the combination hoppers belonging to the discharge combination determined in the combination process start to discharge the objects to be weighed until all the objects to be weighed which have been discharged are fed to the upper collecting hoppers through the upper collecting chutes is within a time which is 1.1 times as long as 1/k of the ideal weighing cycle time; the intermediate collecting chutes may be configured so that a time taken from when the upper collecting hoppers start to discharge the objects to be weighed until all the objects to be weighed which have been discharged are fed to the intermediate collecting hoppers through the intermediate collecting chute is within a time which is 1.1 times as long as 1/k of the ideal weighing cycle time; and the lower collecting chute may be configured so that a time taken from when the intermediate collecting hoppers start to discharge the objects to be weighed until all the objects to be weighed which have been discharged are fed to the lower collecting hopper through the lower collecting chute is within a time which is 1.1 times as long as 1/k of the ideal weighing cycle time.

In accordance with such a configuration, the batch time of the objects to be weighed on each of the upper, intermediate and lower collecting chutes can be suppressed to a time within a specified time. Once in every 1/k time of the ideal weighing cycle time, the combination hoppers selected to make up of the discharge combination discharge the objects to be weighed, all the objects to be weighed which have been discharged from the combination hoppers selected to make up of a discharge combination slide down on the upper collecting chute, and thereafter the combination hoppers selected to make up of a subsequent discharge combination discharge the objects to be weighed. Therefore, mixing between the objects to be weighed discharged previously and the objects to be weighed discharged subsequently on the upper collecting chute can be surely prevented, and the objects to be weighed can be discharged from the upper collecting hopper once in every 1/k time of the ideal weighing cycle time. In addition, after all the objects to be weighed which have been discharged from the upper collecting hoppers slide down on the intermediate collecting chute, the objects to be weighed are subsequently discharged from the upper collecting hoppers. Therefore, mixing between the objects to be weighed discharged previously and the objects to be weighed discharged subsequently on the intermediate collecting chute can be surely prevented, and the objects to be weighed can be discharged from the intermediate collecting hopper once in every 1/k time of the ideal weighing cycle time. Further, after all the objects to be weighed which have been discharged from the intermediate collecting hopper slide down on the lower collecting chute, the objects to be weighed are subsequently discharged from the intermediate collecting hopper. Therefore, mixing between the objects to be weighed discharged previously and the objects to be weighed discharged subsequently on the lower collecting chute can be surely prevented, and the objects to be weighed can be discharged from the lower collecting hopper once in every 1/k time of the ideal weighing cycle time. For example, in the case of k=1, so-called a single shift operation takes place, in the case of k=2, so-called a double shift operation takes place, and in the case of n=3, so-called a triple shift operation takes place.

In the multi-stage chute configuration, the collecting discharge means may further include a collecting hopper which is provided at a discharge outlet of the p-th stage collecting chute and is configured to hold the objects to be weighed which have been discharged from the discharge outlet of the p-th stage collecting chute and to then discharge the objects to be weighed; wherein the control means may be configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein the first-stage collecting chute may be configured so that a time taken from when the combination hoppers belonging to the discharge combination determined in the combination process start to discharge the objects to be weighed until all the objects to be weighed which have been discharged are fed to the upper collecting hoppers through the first-stage collecting chute is within a time which is 1.1 times as long as 1/k of the ideal weighing cycle time; and the q-th stage collecting chute is configured so that a time taken from when the collecting hopper provided at the discharge outlet of the (q−1)-th stage collecting chute start to discharge the objects to be weighed until all the objects to be weighed which have been discharged are fed to the collecting hopper provided at the discharge outlet of the q-th stage collecting chute through the q-th stage collecting chute is within a time which is 1.1 times as long as 1/k of the ideal weighing cycle time.

In accordance with such a configuration, the batch time of the objects to be weighed on each of the first (upper) to p-th stage collecting chutes can be suppressed to a time within a specified time. Once in every 1/k time of the ideal weighing cycle time, the combination hoppers selected to make up of the discharge combination discharge the objects to be weighed, all the objects to be weighed which have been discharged from the combination hoppers selected to make up of a discharge combination slide down on the first-stage (upper) collecting chute, and thereafter the combination hoppers selected to make up of a subsequent discharge combination discharge the objects to be weighed. Therefore, mixing between the objects to be weighed discharged previously and the objects to be weighed discharged subsequently on the first-stage (upper) collecting chute can be surely prevented, and the objects to be weighed can be discharged from the upper collecting hopper once in every 1/k time of the ideal weighing cycle time. In addition, after all the objects to be weighed which have been discharged from the collecting hopper provided at the discharge outlet of the (q−1)-th stage collecting chute slide down on the q-th stage collecting chute, the objects to be weighed are subsequently discharged from the upper collecting hopper. Therefore, mixing between the objects to be weighed discharged previously and the objects to be weighed discharged subsequently on the q-th stage collecting chute can be surely prevented, and the objects to be weighed can be discharged from the collecting hopper provided at the discharge outlet of the q-th collecting chute once in every 1/k time of the ideal weighing cycle time. For example, in the case of k=1, so-called a single shift operation takes place, in the case of k=2, so-called a double shift operation takes place, and in the case of n=3, so-called a triple shift operation takes place.

The combination hopper groups may be formed by a plurality of hopper lines into which a combination hopper line including the plurality of combination hoppers arranged annularly is divided.

The combination hopper groups may be formed by a plurality of linear-shaped hopper lines into which a combination hopper line including the plurality of combination hoppers arranged in one linear-line shape or in plural linear-line shape is divided.

Effects of the Invention

The present invention has the above described configuration, and is capable of reducing a batch time of objects to be weighed on a collecting chute, and of carrying out a high-speed operation irrespective of the characteristic of the objects to be weighed, etc, in the combination weigher.

BRIEF DESCRIPTION OF THE DRAWINGS

The above and further objects, features and advantages of the present invention will more fully be apparent from the following detailed description of preferred embodiments with accompanying drawings.

Figure 1:
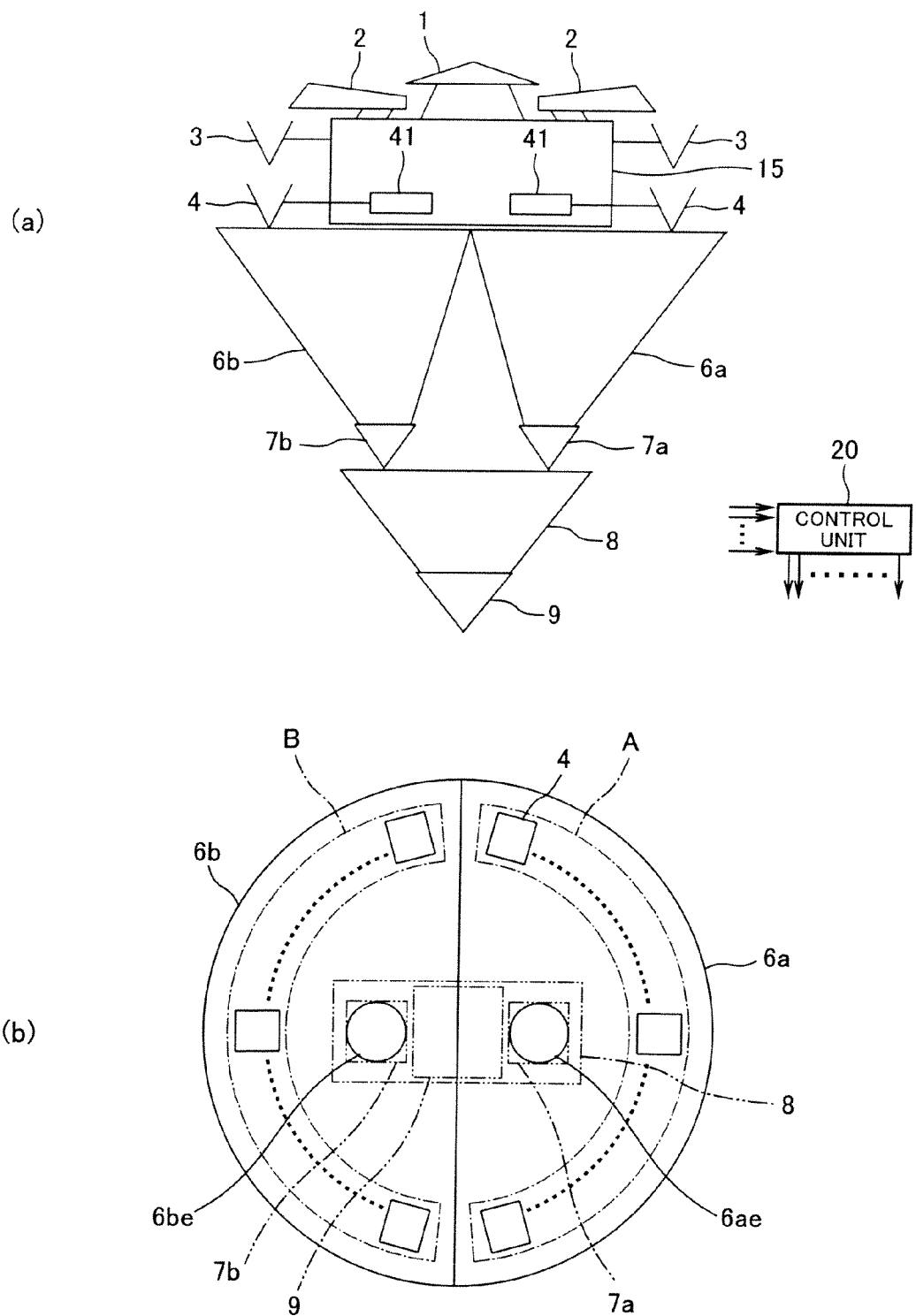
FIG. 1(*a*) is a schematic view of a combination weigher according to Embodiment 1 of the present invention as viewed from the side, a part of which is illustrated in cross-section, and FIG. 1(*b*) is a schematic view of upper collecting chutes and weighing hoppers of the combination weigher as viewed from above.

EXPLANATION OF REFERENCE NUMERALS 1 dispersion feeder
2 linear feeder
3 feeding hopper
4 weighing hopper
5 memory hopper
6a to 6h upper collecting chute
7a to 7h upper collecting hopper
8 lower collecting chute
9 lower collecting hopper
10a, 10b intermediate collecting chute
11a, 11b intermediate collecting hopper
20 control unit

BEST MODE FOR CARRYING OUT THE INVENTION

Hereinafter, preferred embodiments of the present invention will be described with reference to the drawings.

Embodiment 1

FIG. 1(a) is a schematic view of a combination weigher according to Embodiment 1 of the present invention as viewed from the side, a part of which is illustrated in cross-section, and FIG. 1(b) is a schematic view of upper collecting chutes and weighing hoppers of the As shown in FIG. 1(a), the combination weigher is constructed in such a manner that a center base body (body) 15 is disposed at a center of the combination weigher and supported by, for example, four legs (not shown), and a dispersion feeder 1 having a conical shape is mounted to an upper part of the center base body (body) 15 to radially disperse by vibration objects to be weighed supplied from an external supplying device. Around the dispersion feeder 1, a plurality of linear feeders 2 are provided to transport by vibration the objects to be weighed which have been sent from the dispersion feeder 1 into respective feeding hoppers 3. The plurality of feeding hoppers 3 and weighing hoppers 4 are disposed below the linear feeders 2 and are arranged in a circular shape around the center base body 15 in such a manner that each feeding hopper 3 and each weighing hopper 4 correspond to the associated one of the linear feeders 2. The dispersion feeder 1, the linear feeders 2, the feeding hoppers 3 and the weighing hoppers 4 are mounted to the center base body 15. Inside the center base body 15, drive units for them (vibration units for the dispersion feeder 1 and the linear feeders 2, gate opening and closing units for the feeding hoppers 3 and the weighing hoppers 4, and others) are accommodated. Each weighing hopper 4 is attached with a weight sensor 41 such as a load cell, which measures the weight of the objects to be weighed inside the weighing hopper 4. The weight sensors 41 are accommodated inside the center base body 15 along with the drive units. Each weight sensor 41 outputs a measured value to the control unit 20.

Below the weighing hoppers 4 arranged in the circular shape, two upper collecting chutes 6a and 6b each having a semicircular upper part opening are disposed. As defined herein, weighing hoppers 4 in a group A are weighing hoppers 4 which are disposed above the upper collecting chute 6a to correspond to the upper collecting chute 6a. The objects to be weighed which have been discharged from these weighing hoppers 4 slide down on the upper collecting chute 6a. Likewise, weighing hoppers 4 in a group B are weighing hoppers 4 which are disposed above the upper collecting chute 6b to correspond to the upper collecting chute 6b. The objects to be weighed which have been discharged from these weighing hoppers 4 slide down on the upper collecting chute 6b.

Upper collecting hoppers 7a and 7b are disposed at discharge outlets 6ae and 6be of bottom parts of the upper collecting chutes 6a and 6b, respectively. One lower collecting chute 8 is disposed below the two upper collecting hoppers 7a and 7b, and a lower collecting hopper 9 is disposed at a discharge outlet of a bottom part of the lower collecting chute 8.

Below the lower collecting chute 8 of the combination weigher, one packaging machine (e.g., longitudinal pillow packaging machine) having one feed inlet (not shown) is disposed. The objects to be weighed which have been discharged from the lower collecting hopper 9 are fed into the packaging machine feed inlet. The packaging machine charges the objects to be weighed which have been discharged from the combination weigher into bags and packages them while making the bags. Thus, in this embodiment, the objects to be weighed which have been discharged from the upper collecting hoppers 7a and 7b are held in the lower collecting hopper 9, and thereafter are fed to one packaging machine feed inlet.

The control unit 20 controls the operation of the entire combination weigher and performs a combination process to determine one combination (discharge combination) of weighing hoppers 4 which will discharge the objects to be weighed by selecting the weighing hoppers 4 from among those in both of the groups A and B. In the combination process, the combination calculation is performed based on measured values (measured values of the weights of the objects to be weighed inside the weighing hoppers 4, which are obtained using the weight sensors 41) of the weighing hoppers 4 holding the objects to be weighed whose weight values have been measured by the associated weight sensors 41 to determine one combination made up of the weighing hoppers 4 in which a combination weight value which is a total of the measured values falls within an allowable range (predetermined weight range) with respect to a target weight value and determine it as a discharge combination. If the number of combinations whose combination weight values fall within the allowable range with respect to the target weight value is plural, a combination in which, for example, a total measured value is closest to the target weight value (or a combination whose total measured value coincides with the target weight value, if any), i.e., a combination in which an absolute value of a difference between the total measured value and the target weight value is smallest, is found and determined as the discharge combination. In the combination weigher, the target weight value and the allowable range with respect to the target weight value are predetermined. The allowable range is determined such that the target weight value is a lower limit value and a value larger than the target weight value is an upper limit value, for example. By way of example, when the target weight value is set to 400 g, the lower limit value of the allowable range is set to 400 g which is equal to the target weight value, and the upper limit value of the allowable range is set to 420 g which is larger than the target weight value. Alternatively, the allowable range may be determined such that a value smaller than the target weight value is set as the lower limit value and the upper limit value is not set (in this case, the upper limit value may be regarded as infinite).

An outline of the operation of the combination weigher configured as described above will be first described.

The objects to be weighed are supplied from the external supplying device to the dispersion feeder 1. The dispersion feeder 1 feeds the objects to be weighed to the feeding hopper 3 through the linear feeder 2. The feeding hopper 3 feeds the objects to be weighed to the weighing hopper 4. The weight sensor 41 measures the weight of the objects to be weighed which have been fed into each weighing hopper 4, and sends the measured value to the control unit 20. Then, the above described combination process is performed to determine the discharge combination. The weighing hoppers 4 selected to make up of the discharge combination discharge the objects to be weighed and the feeding hoppers 3 feed the objects to be weighed to the weighing hoppers 4 which are empty. The linear feeders 2 feed the objects to be weighed to the feeding hoppers 3 which are empty. The objects to be weighed which have been discharged from the weighing hoppers 4 slide down on the upper collecting chutes 6a and 6b and are held in the upper collecting hoppers 7a and 7b. Thereafter, the objects to be weighed are discharged from the upper collecting hoppers 7a and 7b. Then, the objects to be weighed slide down on the lower collecting chute 8 and are held in the lower collecting hopper 9. After that, the objects to be weighed are discharged to the packaging machine.

Subsequently, operations taking place in the case where discharge cycle times of the combination weigher are made different will be described. As used herein, the term "discharge cycle time" refers to a discharge cycle in which weighing hoppers 4 selected to make up of a discharge combination discharge the objects to be weighed, an operation whose discharge cycle time is equal to an actual weighing cycle time is referred to as a single shift operation, an operation whose discharge cycle time is ½ of the actual weighing cycle time is referred to as a double shift operation, and an operation whose discharge cycle time is equal to ⅓ of the weighing cycle time is referred to as a triple shift operation.

Figure 2:
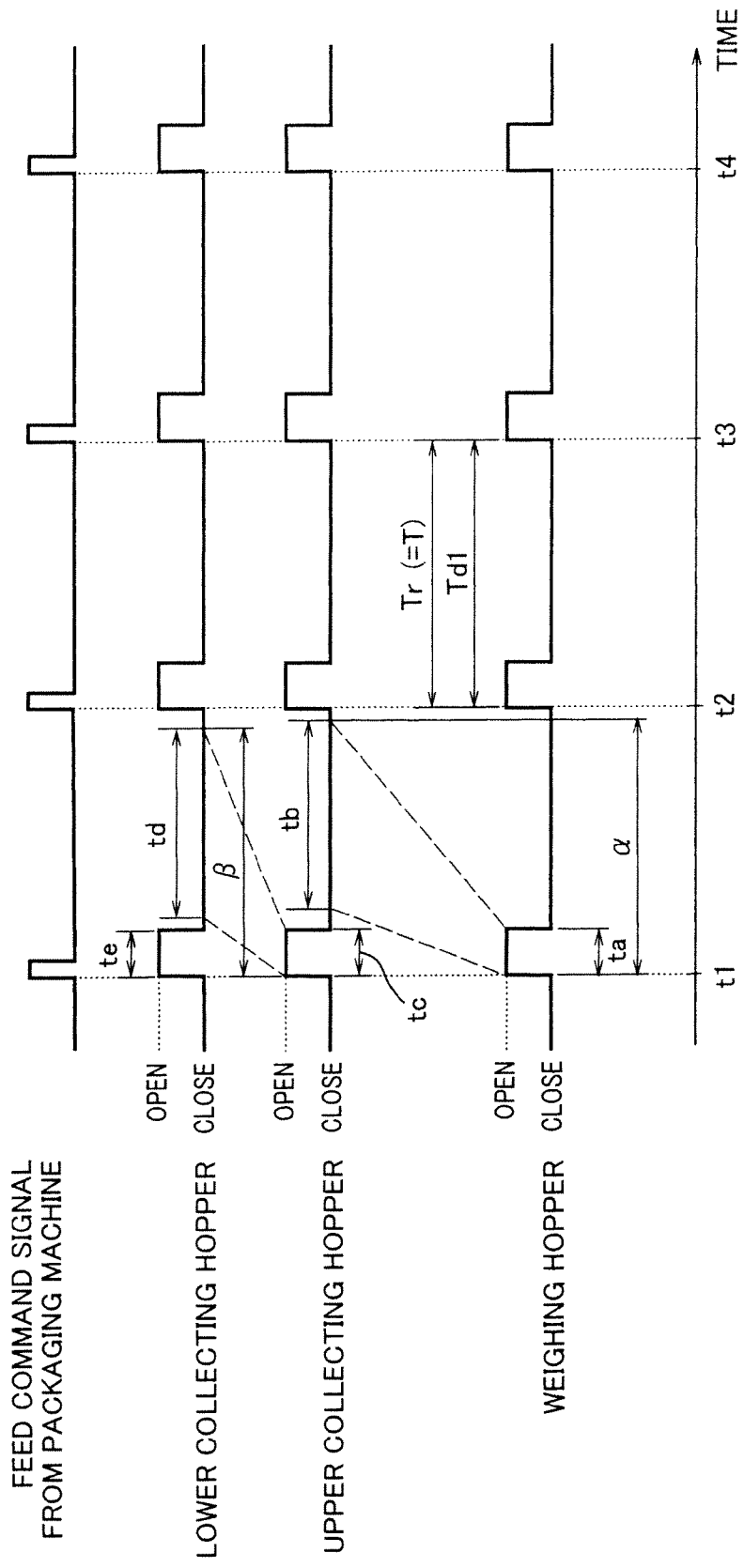
FIG. 2 is a timing chart showing opening and closing operations of gates of collecting hoppers and weighing hoppers in a case where the combination weigher of Embodiment 1 of the present invention is configured to carry out a single shift operation.

FIG. 2 is a timing chart showing the opening and closing operations of the gates of the collecting hoppers and the weighing hoppers in a case where the combination weigher of this embodiment is configured to carry out the single shift operation.

Actual weighing cycle time Tr is, for example, a time period taken to accomplish a procedure in which, immediately after a discharge combination is determined in a combination process in a previous weighing cycle, weighing hoppers 4 selected to make up of the discharge combination discharge the objects to be weighed, the objects to be weighed are subsequently fed to these weighing hoppers 4 belonging to the discharge combination, time for stabilizing the associated weight sensors 41 lapses, these weight sensors 41 measure the weights of the objects to be weighed, thereafter a combination process is performed using at least the measured values of these weighing hoppers 4, and thereby a discharge combination is determined. A case where an allowance time, a wait time, etc, which elapses from when a discharge combination is determined in the combination process until weighing hoppers 4 selected to make up of the discharge combination start to discharge the objects to be weighed is zero is regarded as an ideal weighing cycle time T. The ideal weighing cycle time T is, for example, a time period taken to accomplish a procedure in which weighing hoppers 4 selected to make up of a discharge combination determined in a previous weighing cycle start to discharge the objects to be weighed, the objects to be weighed are subsequently fed to these weighing hoppers 4 belonging to the discharge combination, time for stabilizing the associated weight sensors 41 lapses, these weight sensors 41 measure the weights of the objects to be weighed, thereafter a combination process is performed using at least the measured values of these weighing hoppers 4, and thereby a discharge combination is determined. In the example shown in FIG. 2, the actual weighing cycle time Tr is equal to the ideal weighing cycle time T, that is, the combination weigher is operated at a maximum speed, and a discharge cycle time Td1 associated with the weighing hoppers 4 is equal to the actual weighing cycle time Tr (=T).

In the configuration for causing the combination weigher to perform the single shift operation, for example, the number of weighing hoppers 4 in each of the groups A and B is set to five, the total number of the weighing hoppers 4 is set to ten, and the number of weighing hoppers 4 which would be selected to make up of a discharge combination is set to four, so that desired weighing precision is attained. The phrase "the number of weighing hoppers 4 which would be selected in the combination process is set to four" means that the operation of the linear feeders 2 and others is set so that a target feed amount of the objects to be weighed which are fed from each feeding hopper 3 to an associated weighing hopper 4 is substantially ¼ of a target weight value.

In the single shift operation, once in every actual weighing cycle time Tr (in this example, Tr=T), the combination process is performed and weighing hoppers 4 belonging to the discharge combination selected in the combination process discharge the objects to be weighed. Therefore, the weighing hoppers 4 belonging to the discharge combination sequentially determined by repeating the combination process once in every Tr time, discharge the objects to be weighed to the upper collecting chutes 6a and 6b. Correspondingly, once in every Tr time, the upper collecting hoppers 7a and 7b discharge the objects to be weighed simultaneously, and the lower collecting hopper 9 discharges the objects to be weighed. In this way, once in every actual weighing cycle time Tr, the objects to be weighed are fed into the packaging machine.

When the combination weigher is operated continuously, the control unit 20 opens the gate of the lower collecting hopper 9 to discharge the objects to be weighed to the packaging machine, in response to, for example, a feed command signal received from the packaging machine (time t1, t2, t3, . . . ). Whereas in this example, opening operations of the gates of the lower collecting hopper 9, the upper collecting hoppers 7a and 7b, and the weighing hopper 4 are caused to take place at the same timings, they may take place at different timings. The control unit 20 controls the opening and closing timings of the gates of the lower collecting hopper 9, the upper collecting hoppers 7a and 7b, and the weighing hoppers 4 based on, for example, input timings of the feed command signal received from the packaging machine.

In the configuration of FIG. 2, the objects to be weighed which have been discharged from the weighing hoppers 4 by opening their gates at time t1 are gathered in the upper collecting hoppers 7a and 7b and are held therein until time t2, the objects to be weighed which have been discharged from the upper collecting hoppers 7a and 7b by opening their gates at time t2 are gathered in the lower collecting hopper 9 and are held therein until time t3, and the lower collecting hopper 9 opens its gate to discharge the objects to be weighed to the packaging machine at time t3.

By the single shift operation performed as described above, the objects to be weighed are discharged to the packaging machine once in every Tr time.

Subsequently, the operation taking place in the configuration for causing the combination weigher to carry out the double shift operation will be described in detail. In the configuration for causing the combination weigher to carry out the double shift operation, for example, the number of weighing hoppers 4 in each of the groups A and B is set to seven, the total number of the weighing hoppers 4 is set to fourteen, and the number of weighing hoppers 4 which would be selected in the combination process is set to four. In this case, in the combination process repeated, four weighing hoppers 4 are selected from among about ten weighing hoppers 4 to make up of a discharge combination. The weighing precision which is substantially equal to that attained in the single shift operation on condition that the total number of weighing hoppers 4 is ten and the number of weighing hoppers 4 which would be selected in the combination process is four, is attained.

Figure 3:
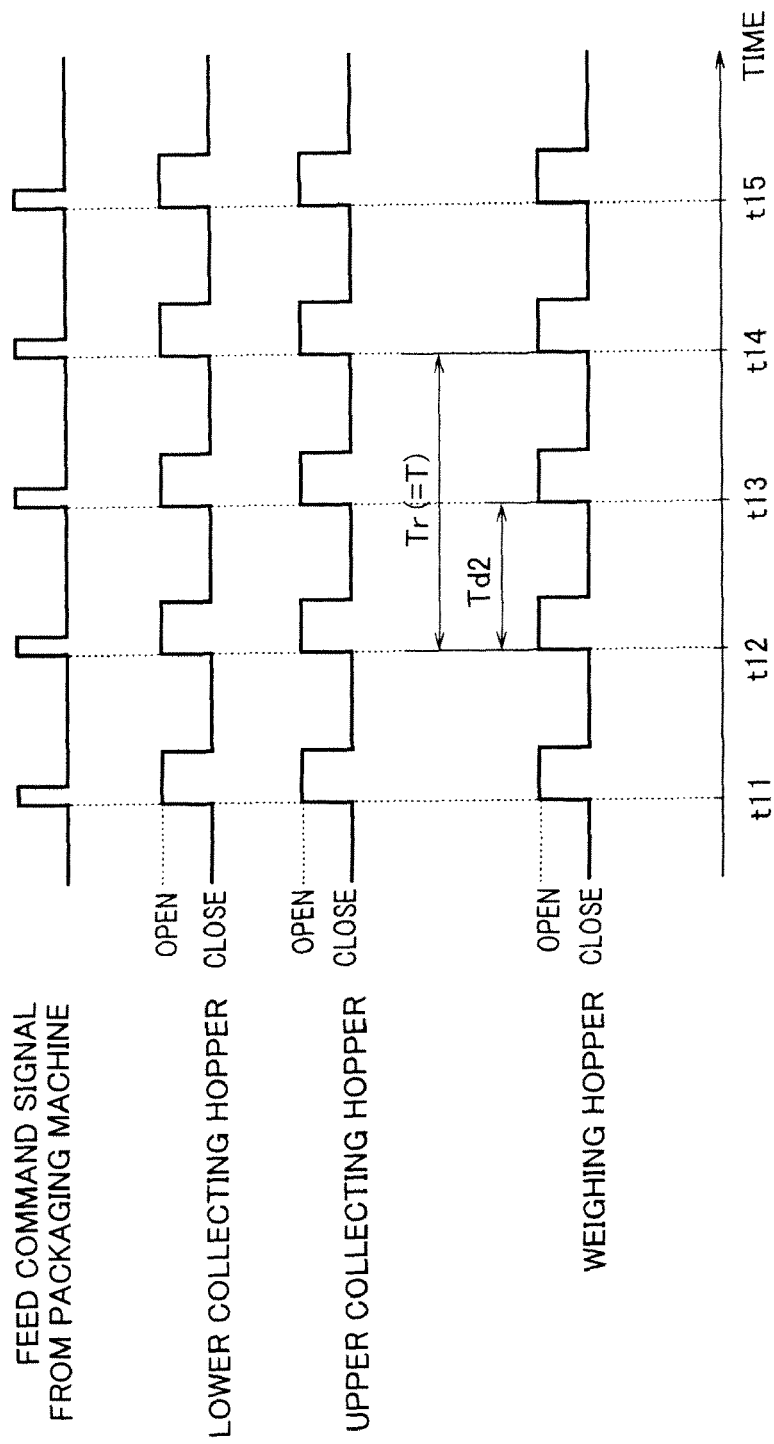
FIG. 3 is a timing chart showing opening and closing operations of gates of collecting hoppers and weighing hoppers in a case where the combination weigher of Embodiment 1 of the present invention is configured to carry out a double shift operation.

FIG. 3 is a timing chart showing the opening and closing operations of the gates of the collecting hoppers and the weighing hoppers in a case where the combination weigher of this embodiment is configured to carry out the double shift operation. In the example shown in FIG. 3, as in the example shown in FIG. 2, the actual weighing cycle time Tr is equal to the ideal weighing cycle time T, that is, the combination weigher is operated at a maximum speed, and a discharge cycle time Td2 associated with the weighing hoppers 4 is equal to ½ of the actual weighing cycle time Tr (=T).

In the double shift operation, once in every Tr/2 time, the combination process is performed and weighing hoppers 4 belonging to the discharge combination selected in the combination process discharge the objects to be weighed. Therefore, the weighing hoppers 4 belonging to the discharge combination sequentially determined by repeating the combination process once in every Tr/2 time discharge the objects to be weighed to the upper collecting chutes 6a and 6b. Correspondingly, once in every Tr/2 time, the upper collecting hoppers 7a and 7b discharge the objects to be weighed simultaneously, and the lower collecting hopper 9 discharges the objects to be weighed. In this way, once in every Tr/2 time, the objects to be weighed are fed into the packaging machine.

When the combination weigher is operated continuously, the control unit 20 opens the gate of the lower collecting hopper 9 to discharge the objects to be weighed to the packaging machine, in response to, for example, a feed command signal received from the packaging machine (time t11, t12, t13, . . . ). Whereas in this example, opening operations of the gates of the lower collecting hopper 9, the upper collecting hoppers 7a and 7b, and the weighing hopper 4 are caused to take place at the same timings, they may take place at different timings. The control unit 20 controls the opening and closing timings of the gates of the lower collecting hopper 9, the upper collecting hoppers 7a and 7b, and the weighing hoppers 4 based on, for example, input timings of the feed command signal received from the packaging machine.

In the configuration of FIG. 3, the objects to be weighed which have been discharged from the weighing hoppers 4 by opening their gates at time t11 are gathered in the upper collecting hoppers 7a and 7b and are held therein until time t12, the objects to be weighed which have been discharged from the upper collecting hoppers 7a and 7b by opening their gates at time t12 are gathered in the lower collecting hopper 9 and are held therein until time t13, and the lower collecting hopper 9 opens its gate to discharge the objects to be weighed to the packaging machine at time t13.

By the double shift operation performed as described above, the objects to be weighed are discharged to the packaging machine once in every Tr/2 time. The discharge at a speed which is twice as high as that of the single shift operation is achieved, and therefore, the combination weigher is adapted to a packaging machine operated at a high speed.

The combination weigher of this embodiment is configured to carry out the triple shift operation. In this case, a discharge cycle time (Td3) associated with the weighing hoppers 4 is ⅓ of the actual weighing cycle time (Tr). In the configuration for causing the combination weigher to carry out the triple shift operation, for example, the number of weighing hoppers 4 in each of the groups A and B is set to nine, the total number of the weighing hoppers 4 is set to eighteen, and the number of weighing hoppers 4 which would be selected in the combination process is set to four. In this case, in the combination process repeated, four weighing hoppers 4 are selected from among about ten weighing hoppers 4 to make up of a discharge combination. The weighing precision which is substantially to equal to that attained in the single shift operation on condition that the total number of weighing hoppers 4 is ten and the number of weighing hoppers 4 which would be selected in the combination process is four, is attained.

In the triple shift operation, once in every Tr/3 time, the combination process is performed and the weighing hoppers 4 belonging to the discharge combination selected in the combination process discharge the objects to be weighed. Therefore, the weighing hoppers 4 belonging to the discharge combination determined sequentially by repeating the combination process once in every Tr/3 time discharge the objects to be weighed to the upper collecting chutes 6a and 6b. Correspondingly, once in every Tr/3 time, the upper collecting hoppers 7a and 7b discharge the objects to be weighed simultaneously, and the lower collecting hopper 9 discharge the objects to be weighed. In this way, once in every Tr/3 time, the objects to be weighed are fed into the packaging machine.

By the triple shift operation performed as described above, the objects to be weighed are discharged to the packaging machine once in every Tr/3 time. The discharge at a speed which is three times as high as that of the single shift operation is achieved, and therefore, the combination weigher is adapted to a packaging machine operated at a high speed.

As should be understood from the above, in order to maintain desired weighing precision and to increase the weighing speed in the combination weigher, it is necessary to increase the number of weighing hoppers 4 which participate in the combination calculation.

Figure 10:
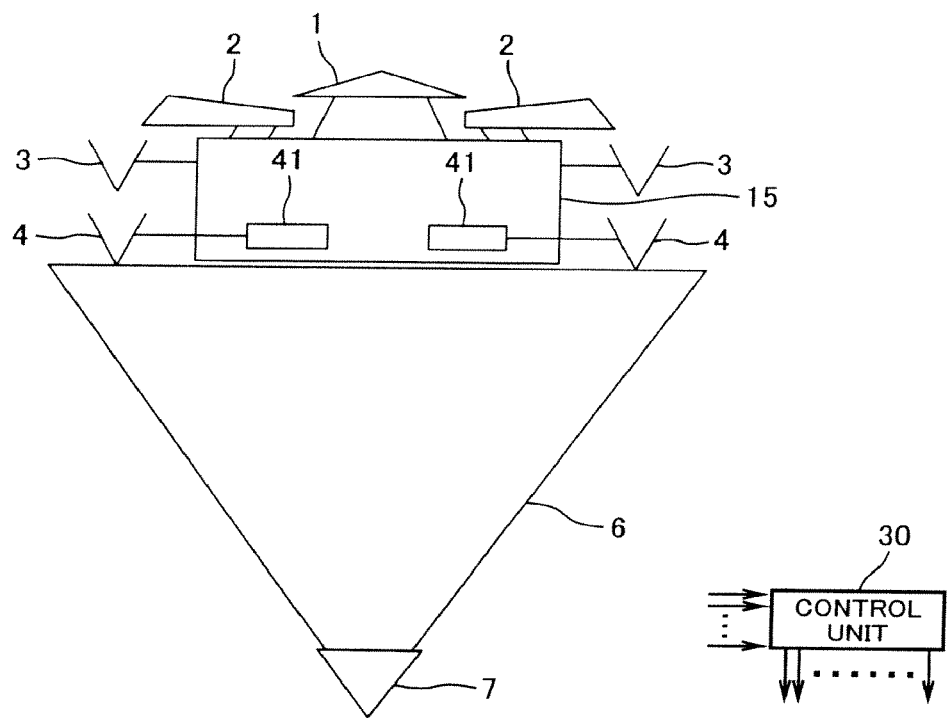
FIG. 10 is a schematic view of a conventional combination weigher as viewed from the side, a part of which is illustrated in cross-section.

In this embodiment, one collecting chute in the conventional example is divided into plural-stage (herein two-stage) collecting chutes consisting of the plural upper collecting chutes 6a and 6b and the one lower collecting chute 8, the collecting hoppers 7a and 7b are provided at discharge outlets of the upper collecting chutes 6a and 6b, and the upper collecting hoppers 7a and 7b are positioned higher than the collecting hopper 7 (see FIG. 10) in the configuration using one collecting chute. In this case, the upper collecting chutes 6a and 6b are tilted slightly gently. By reducing the vertical dimension of the upper collecting chutes 6a and 6b, a transfer distance of the objects to be weighed which slide down on the upper collecting chutes 6a and 6b can be reduced, and a transfer time therefor can be reduced. Furthermore, in this case, by increasing upper part opening areas of the upper collecting hoppers 7a and 7b, a transfer distance of the objects to be weighed on the upper collecting chutes 6a and 6b can be reduced, and a transfer time therefor can be reduced.

As described above, the transfer distance and the transfer time of the objects to be weighed on the upper collecting chutes 6a and 6b can be reduced, and therefore, the objects to be weighed can be gathered in the upper collecting hoppers 7a and 7b in a state where a batch length of the objects to be weighed which have been discharged from the weighing hoppers 4 is small. For this reason, a batch time of the objects to be weighed on the upper collecting chutes 6a and 6b can be reduced, even when using the objects to be weighed having characteristics which tends to increase a batch time thereof on the collecting chute, or even in, for example, a large-sized combination weigher which includes weighing hoppers 4 whose total number is large and has a large arrangement shape (in the configuration of FIG. 1, a diameter of a circular shape in which the weighing hoppers 4 are arranged, is large).

Since the upper collecting hoppers 7a and 7b are provided at the discharge outlets of the upper collecting chutes 6a and 6b, the objects to be weighed can be discharged to the lower collecting chute 8 in a state where the objects to be weighed are lumped together. Thus, the objects to be weighed can be discharged from the upper collecting hoppers 7a and 7b to the lower collecting chute 8 in a state where the objects to be weighed are lumped together. In addition, by reducing the size of the lower collecting chute 8, the transfer distance and the transfer time of the objects to be weighed on the lower collecting chute 8 can be reduced, and the objects to be weighed can be gathered in the lower collecting hopper 9 in a state where a batch length of the objects to be weighed which are discharged from the upper collecting hoppers 7a and 7b is small. For this reason, a batch time of the objects to be weighed on the lower collecting chute 8 can be reduced, even when using the objects to be weighed having a characteristic which tends to increase a batch time thereof on the collecting chute, or even in a large-sized combination weigher which has a large arrangement shape (in the configuration of FIG. 1, a diameter of a circular shape in which the weighing hoppers 4 are arranged is large). In addition, because of the presence of the lower collecting hopper 9, the objects to be weighed can be discharged to the packaging machine feed inlet in a state where the objects to be weighed are lumped together.

As should be appreciated from the above, the batch time of the objects to be weighed on the upper and lower collecting chutes can be reduced, irrespective of the characteristic of the objects to be weighed or the size of the arrangement shape of the weighing hoppers 4 (in the configuration of FIG. 1, the size of the diameter of the circular shape in which the weighing hoppers 4 are arranged). By configuring the setting so that a batch time of the objects to be weighed on each of the upper and lower collecting chutes is suppressed to a certain time (allowable batch time) assumed for each operation and each collecting chute in the above described operation such as the single shift operation, the double shift operation or the triple shift operation, a high-speed operation is achieved without reducing an operation speed.

The allowable batch time assumed for each of the operations and collecting chutes is, for example, a time obtained by subtracting set time S for each collecting chute from a desired discharge cycle time (Td1, Td2, Td3) for each operation. By setting a desired discharge cycle time Td1=T (ideal weighing cycle time) in the case where the single shift operation is carried out, an operation at a maximum speed is achieved. Likewise, by setting a desired discharge cycle time Td2=T/2 in the case where the double shift operation is carried out, or by setting a desired discharge cycle time Td3=T/3 in the case where the triple shift operation is carried out, an operation at a maximum speed is achieved. In the configuration of FIG. 1, for example, the set time S for the upper collecting chutes 6a and 6b is a time during which the upper collecting hoppers 7a and 7b open their gates to discharge the objects to be weighed, and the set time S for the lower collecting chute 8 is a time during which the lower collecting hopper 9 opens its gate to discharge the objects to be weighed. As described later, in a case where the lower collecting hopper 9 is omitted, the set time S for the lower collecting chute 8 may be set to a predetermined time which does not impede an operation of the packaging machine disposed therebelow. For the batch time of the objects to be weighed on each of the upper and lower collecting chutes, a test (e.g., test using a test model) may be conducted using the objects to be weighed which are weighed in this combination weigher, and the collecting chutes and others may be designed and manufactured so that a batch time of the objects to be weighed is an allowable batch time or less.

For example, in the configuration for causing the combination weigher to carry out single shift operation, as shown in FIG. 2, when the gates of the weighing hoppers 4 are opened during a period to (period from when the gates of the weighing hoppers 4 start to be opened until they are closed, through an open state), the objects to be weighed which have been discharged from the weighing hoppers 4 are fed to the upper collecting hoppers 7a and 7b during a period tb. At time t2 immediately after a lapse of a periodα (hereinafter referred to as an upper collecting chute transfer period) from when the gates of the weighing hoppers 4 start to be opened until a tail part of a batch of the objects to be weighed which will arrive at the upper collecting hoppers 7a and 7b are fed to the upper collecting hoppers 7a and 7b, the gates of the upper collecting hoppers 7a and 7b are opened to discharge the objects to be weighed. Thus, the upper collecting chutes 6a and 6b are configured so that a time required for the upper collecting chute transfer period α falls within the ideal weighing cycle time T. If the time required for the upper collecting chute transfer period α is set too longer than the ideal weighing cycle time T, undesirably, two batches of the objects to be weighed are likely to be present on the upper collecting chutes 6a and 6b, and are likely to be mixed (event 1). On the other hand, if the time is set shorter, weighing capability does not improve, but a transfer speed of the objects to be weighed becomes high and the objects to be weighed are likely to be damaged (event 2). According to an empirical rule, in view of the event 1, it is desired that the time required for the upper collecting chute transfer period α be set to 1.1 times of the ideal weighing cycle time T (Td1) or less. Besides, in view of the event 2, it is desired that the time required for the upper collecting chute transfer period α be set to 0.9 to 1.1 times of the ideal weighing cycle time T (Td1). Therefore, the upper collecting chutes 6a and 6b are configured so that the time required for the upper collecting chute transfer period α be set to 1.1 times of the ideal weighing cycle time T (Td1) or less and 0.9 times of the ideal weighing cycle time T or more. Also, the discharge period tc (gate open period of the upper collecting hoppers 7a and 7b) of the objects to be weighed which are discharged from the upper collecting hoppers 7a and 7b is set within a period outside the period tb during which the objects to be weighed are fed to the upper collecting hoppers 7a and 7b. In the manner described above, the upper collecting chutes 6a and 6b can be configured so that the batch time (tb) of the objects to be weighed on the upper collecting chutes 6a and 6b is the allowable batch time (Td1−tc) or less. In addition, since the objects to be weighed which are discharged previously from the weighing hoppers 4 and the objects to be weighed which are discharged subsequently from the weighing hoppers 4 do not exist together on the upper collecting chute 6a or 6b, mixing between the objects to be weighed which are discharged previously and the objects to be weighed which are discharged subsequently on the upper collecting chute 6a or 6b can be surely prevented.

The lower collecting chute 8 may be configured in the same manner. To be specific, the lower collecting chute 8 is configured so that a period β (hereinafter referred to as a lower collecting chute transfer period) from when the gates of the upper collecting hoppers 7a and 7b start to be opened until a tail part of a batch of the objects to be weighed which will arrive at the lower collecting hopper 9 are fed to the lower collecting hopper 9 is 1.1 times of the ideal weighing cycle time T (=Td1) or less, and 0.9 times of the ideal weighing cycle time T or more. Also, the discharge period te (gate open period of the lower collecting hopper 9) of the objects to be weighed which are discharged from the lower collecting hopper 9 is set to a period outside the period td during which the objects to be weighed are fed to the lower collecting hopper 9. In the manner described above, the lower collecting chute 8 can be configured so that the batch time (td) of the objects to be weighed on the lower collecting chute 8 is the allowable batch time (Td1−te) or less. In addition, since the objects to be weighed which are discharged previously from the upper collecting hoppers 7a and 7b and the objects to be weighed which are discharged subsequently from the upper collecting hoppers 7a and 7b do not exist together on the lower collecting chute 8, mixing between the objects to be weighed which are discharged previously and the objects to be weighed which are discharged subsequently on the lower collecting chute 8 can be surely prevented.

By configuring the upper collecting chutes 6a and 6b and the lower collecting chute 8, mixing between previous objects to be weighed and subsequent objects to be weighed on the upper collecting chutes 6a and 6b and the lower collecting chute 8 can be surely prevented, and an operation in a desired discharge cycle time Td1=T is achieved.

Likewise, in the configuration for causing the combination weigher to carry out the double shift operation, the upper collecting chutes 6a and 6b are configured so that a time required for the upper collecting chute transfer period is 1.1 times of T/2 time (=Td2) or less and 0.9 time of T/2 time (=Td2) or more, and the lower collecting chute 8 is configured so that a time required for the lower collecting chute transfer period is 1.1 times of T/2 time (=Td2) or less and 0.9 time of T/2 time (=Td2) or more. Also, in the configuration for causing the combination weigher to carry out the triple shift operation, the upper collecting chutes 6a and 6b are configured so that a time required for the upper collecting chute transfer period is 1.1 times of T/3 time (=Td3) or less, and 0.9 time of T/3 time (=Td3) or more, and the lower collecting chute 8 is configured so that a time required for the lower collecting chute transfer period is 1.1 times of T/3 time (=Td3) or less, and further 0.9 time of T/3 time (=Td3) or more.

Since the transfer distance of the objects to be weighed which slide down on each of the upper collecting chutes 6a and 6b and the lower collecting chute 8 is short, a maximum speed of the objects to be weighed sliding down is suppressed, so that impact generated when the objects to be weighed collide against each other or generated due to the collision of the objects to be weighed collide against the inner walls of the collecting hoppers 7a, 7b, and 9 which occurs when the objects to be weighed enter the collecting hoppers 7a, 7b, and 9 is made small. As a result, damage to the objects to be weighed can be prevented.

In this embodiment, the lower collecting chute 8 may be omitted in a case where the upper collecting hoppers 7a and 7b are capable of directly feeding the objects to be weighed to the upper part opening of the lower collecting hopper 9, by for example, increasing the size of the upper part opening of the lower collecting hopper 9.

The lower collecting hopper 9 may be omitted in a case where a batch length of the objects to be weighed which are discharged from the upper collecting hoppers 7a and 7b onto the lower collecting chute 8 is sufficiently small, a batch length of the objects to be weighed which are discharged from the bottom part discharge outlet of the lower collecting chute 8 can be made small, and the packaging operation of the packaging machine is not impeded, without the lower collecting hopper 9. In this case, because of the absence of the lower collecting hopper 9, a structure is simplified, and a control therefor is omitted. The control unit 20 is configured to cause the upper collecting hoppers 7a and 7b to discharge the objects to be weighed, in response to, for example, a feed command signal from the packaging machine.

The lower collecting chute 8 and the lower collecting hopper 9 may be omitted in a case where the upper collecting hoppers 7a and 7b are capable of directly feeding the objects to be weighed to one packaging machine feed inlet. For example, in a case where a packaging machine feed inlet has a widened upper part and its opening diameter is large, the objects to be weighed which are discharged from the upper collecting hoppers 7a and 7b can be directly fed to the packaging machine feed inlet. In this case, because of the absence of the lower collecting chute 8 and the lower collecting hopper 9, a structure is simplified, and a control for the lower collecting hopper 9 is dispensed with, as in the configuration in which the lower collecting hopper 9 is omitted.

Whereas in Embodiment 1, the upper collecting chute consist of two upper collecting chutes each having an upper part opening having a sector shape (circular-arc shape) with a central angle of 180 degrees, it may be configured to consist of three or more upper collecting chutes each having an upper part opening having a sector shape (circular-arc shape). In this case, also, the upper collecting hoppers are provided at the bottom part discharge outlet of each upper collecting chute. In addition, the number of weighing hoppers 4 need not be equal to each other between groups of weighing hoppers respectively corresponding to the upper collecting chutes. In the configuration in which the upper collecting chute consists of three or more collecting chutes, the lower collecting chute is configured to gather the objects to be weighed which have been discharged from all the upper collecting hoppers and to discharge them. In the configuration in which the upper collecting chute consists of three or more collecting chutes, the upper part opening of each upper collecting chute can be formed to have a sector shape with a central angle of 180 degrees or less. This makes it easy to increase the inclination angle of each upper collecting chute so that the transfer distance and the transfer time of the objects to be weighed on each upper collecting chute can be reduced, and a batch time of the objects to be weighed thereon can be reduced.

The size of the upper collecting hoppers 7a and 7b can be reduced, by configuring the setting in the combination process so that at least one weighing hopper 4 is selected without fail to make up of a discharge combination from each of the groups A and B respectively corresponding to the upper collecting chutes 6a and 6c or a maximum number of the weighing hoppers 4 selected from each of the groups A and B is limited to less than the number of the weighing hoppers 4 which would be selected. For example, when four weighing hoppers 4 are selected to make up of the discharge combination (when the number of weighing hoppers 4 which would be selected is four), combination calculation is performed under a condition in which at least one weighing hopper 4 is selected from each of the groups A and B, or a maximum number of the weighing hoppers 4 which are selected from each of the groups A and B is three. If such a condition is not set, then the upper collecting hoppers 7a and 7b are each required to have a volume for accommodating the objects to be weighed which have been discharged from the four weighing hoppers 4. However, if the condition is set, the number of weighing hoppers 4 which discharge the objects to be weighed to the upper collecting chutes 6a and 6b is three at maximum, and therefore, it suffices that the upper collecting hoppers 7a and 7b are each formed to have a volume for accommodating the objects to be weighed from the three weighing hoppers 4. In other words, by determining the discharge combination so that the objects to be weighed inside the weighing hoppers 4 belonging to the discharge combination which will discharge the objects to be weighed to the upper collecting chutes 6a and 6b are discharged to respective of the two upper collecting chutes 6a and 6b without fail, the size of the collecting hoppers 7a and 7b can be reduced.

Embodiment 2

FIG. 4(a) is a schematic view of a combination weigher according to Embodiment 2 of the present invention as viewed from the side, a part of which is illustrated in cross-section, and FIG. 4(b) is a schematic view of upper collecting chutes and weighing hoppers of the combination weigher as viewed from above.

In Embodiment 1 shown in FIG. 1, the collecting chute consists of two-stage collecting chutes, i.e., the upper and lower collecting chutes, while in this embodiment, the collecting chute consists of three-stage collecting chutes, i.e., upper, intermediate, and lower collecting chutes.

In this embodiment, below the weighing hoppers 4 arranged in the circular shape, four upper collecting chutes 6c, 6d, 6e, and 6f each having an upper part opening of a sector shape (circular-arc shape) are disposed. The weighing hoppers 4 in a group C are weighing hoppers 4 which are disposed above the upper collecting chute 6c to correspond to the upper collecting chute 6c. The objects to be weighed which have been discharged from these weighing hoppers 4 slide down on the upper collecting chute 6c. The same applies to the weighing hoppers 4 in groups D, E, and F. The objects to be weighed which have been discharged from the weighing hoppers 4 in the group D slide down on the upper collecting chute 6d. The objects to be weighed which have been discharged from the weighing hoppers 4 in the group E slide down on the upper collecting chute 6e. The objects to be weighed which have been discharged from the weighing hoppers 4 in the group F slide down on the upper collecting chute 6f.

Upper collecting hoppers 7c, 7d, 7e, and 7f are provided at discharge outlets 6ce, 6de, 6ee, and 6fe of bottom parts of the upper collecting chutes 6c, 6d, 6e, and 6f, respectively. In FIG. 4(a), the upper collecting chutes 6d and 6e are located on back side of the upper collecting chutes 6c and 6f and the collecting hoppers 7d and 7e are located on back side of the collecting hoppers 7c and 7f. Therefore, the upper collecting chutes 6d and 6e and the collecting hoppers 7d and 7e are invisible.

Below the two upper collecting hoppers 7c and 7d, one intermediate collecting chute 10a is disposed, and an intermediate collecting hopper 11a is provided at a discharge outlet of the intermediate collecting chute 10a. Likewise, bellow the two upper collecting hoppers 7e and 7f, one intermediate collecting chute 10b is disposed, and an intermediate collecting hopper 11b is provided at a discharge outlet of the intermediate collecting chute 10b. Furthermore, bellow the two intermediate collecting hoppers 11a and 11b, one lower collecting chute 8 is disposed, and a lower collecting hopper 9 is provided at a discharge outlet of the lower collecting chute 8.

The other configuration is identical to that of Embodiment 1, and a description therefor is omitted. In addition, the dispersion feeder 1, the linear feeders 2 and the feeding hoppers 3 operate as in those of Embodiment 1 and a description therefor is omitted.

The control unit 20 controls the operation of the entire combination weigher as in Embodiment 1, and performs a combination process to determine a combination (discharge combination) of weighing hoppers 4 which will discharge the objects to be weighed, which are selected from among those in all the groups C to F.

In this configuration, the objects to be weighed which have been discharged from the weighing hoppers 4 belonging to the discharge combination slide down on the upper collecting chutes 6c to 6f, are held in the upper collecting hoppers 7c to 7f, and then are discharged from the upper collecting hoppers 7c to 7f. The objects to be weighed which have been discharged from the upper collecting hoppers 7c and 7d slide down on the intermediate collecting chute 10a, and are held in the intermediate collecting hopper 11a. Likewise, the objects to be weighed which have been discharged from the upper collecting hoppers 7e and 7f slide down on the intermediate collecting chute 10b, and are held in the intermediate collecting hopper 11b. The objects to be weighed which have been discharged from the intermediate collecting hoppers 11a and 11b slide down on the lower collecting chute 8, are held in the lower collecting hopper 9, and thereafter are discharged to the packaging machine.

Figure 5:
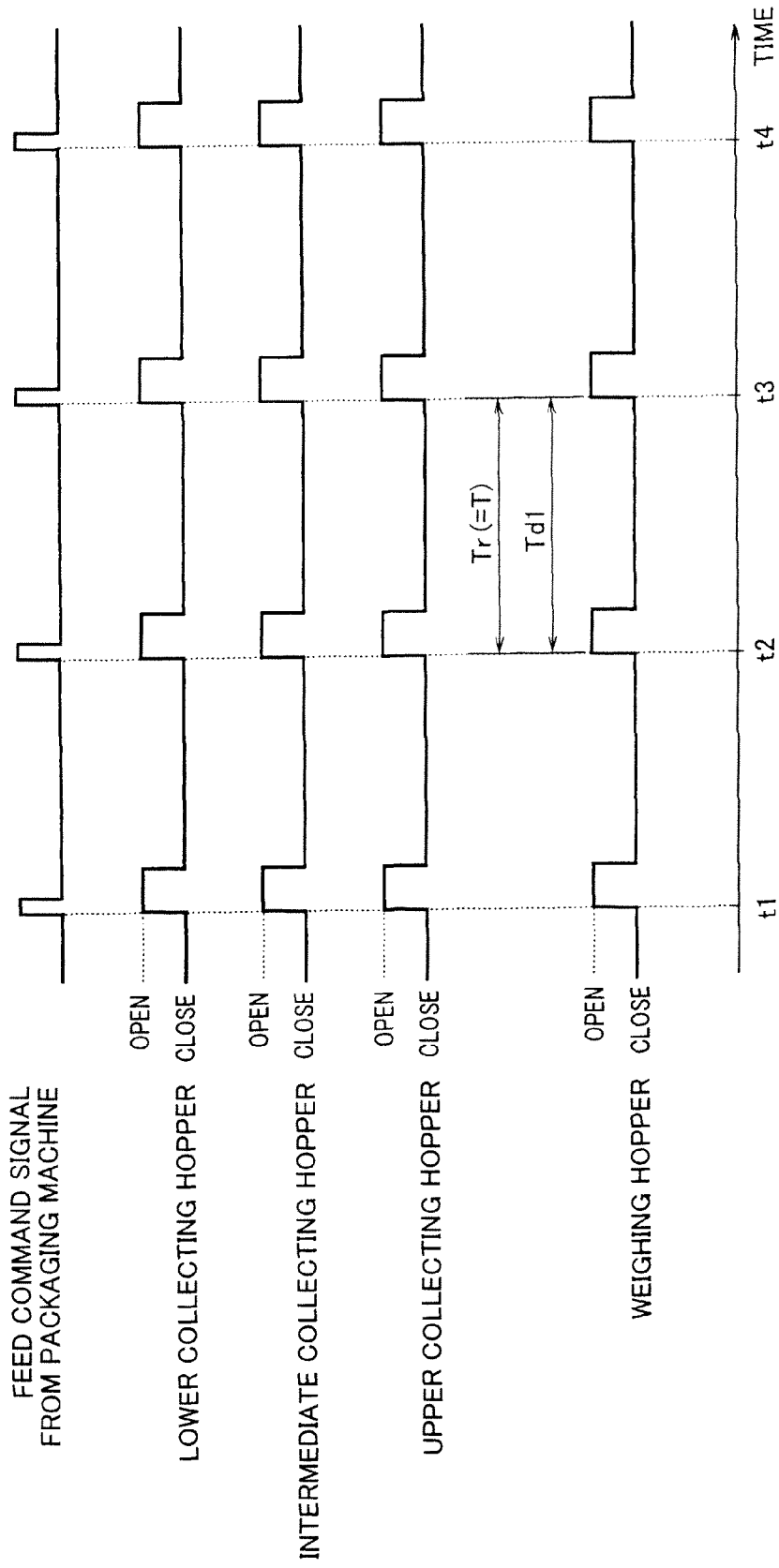
FIG. 5 is a timing chart showing opening and closing operations of gates of collecting hoppers and weighing hoppers in a case where the combination weigher of Embodiment 2 of the present invention is configured to carry out the single shift operation.

FIG. 5 is a timing chart showing the opening and closing operations of the gates of the collecting hoppers and the weighing hoppers in a case where the combination weigher of this embodiment is configured to carry out the single shift operation. In the example of FIG. 5, a case where the actual weighing cycle time Tr is equal to the ideal weighing cycle time T, that is, a case where the combination weigher is operated at a maximum speed, and the discharge cycle time Td1 associated with the weighing hoppers 4 is equal to the actual weighing cycle time Tr (=T).

In the configuration for causing the combination weigher to carry out the single shift operation, for example, the number of weighing hoppers 4 in each of the groups C to F is set to three, the total number of the weighing hoppers 4 is set to twelve, and the number of weighing hoppers 4 which would be selected to make up of a discharge combination in the combination process is set to six, so that desired weighing precision is obtained.

In the single shift operation, once in every actual weighing cycle time Tr (in this example, Tr=T), the combination process is performed and weighing hoppers 4 belonging to the discharge combination selected in the combination process discharge the objects to be weighed. Therefore, the weighing hoppers 4 belonging to the discharge combination sequentially determined by repeating the combination process once in every Tr time discharge the objects to be weighed to the upper collecting chutes 6c to 6f. Correspondingly, once in every Tr time, all the upper collecting hoppers 7c to 7f discharge the objects to be weighed simultaneously, and the intermediate collecting hoppers 11a and 11b discharge the objects to be weighed simultaneously. Likewise, once in every Tr time, the lower collecting hopper 9 discharge the objects to be weighed. In this way, once in every actual weighing time Tr, the objects to be weighed are fed into the packaging machine.

When the combination weigher is operated continuously, the control unit 20 causes the lower collecting hopper 9 to open its gate to discharge the objects to be weighed to the packaging machine, in response to, for example, a feed command signal received from the packaging machine (time t1, t2, t3, . . . ). Whereas in this example, the opening operations of the gates of the lower collecting hopper 9, the intermediate collecting hoppers 11a and 11b, the upper collecting hoppers 7c to 7f, and the weighing hopper 4 are caused to take place at the same timings, they may take place at different timings. The control unit 20 controls the opening and closing timings of the gates of the lower collecting hopper 9, the intermediate collecting hoppers 11a and 11b, the upper collecting hoppers 7c to 7f and the weighing hoppers 4 based on, for example, input timing of the feed command signal received from the packaging machine.

In the configuration of FIG. 5, the objects to be weighed which have been discharged from the weighing hoppers 4 by opening their gates at time t1 are gathered in the upper collecting hoppers 7c to 7f, and are held therein until time t2, the objects to be weighed which have been discharged from the upper collecting hoppers 7c to 7f by opening their gates at time t2 are gathered in the intermediate collecting hoppers 11a and 11b and are held therein until time t3, the objects to be weighed which have been discharged from the intermediate collecting hoppers 11a and 11b by opening their gates at time t3 are gathered in the lower collecting hopper 9 and are held therein until t4, and the lower collecting hopper 9 opens its gate to discharge the objects to be weighed to the packaging machine at time t4.

By the single shift operation performed as described above, the objects to be weighed are discharged to the packaging machine once in every Tr time.

Subsequently, the operation taking place in the configuration for causing the combination weigher to carry out the double shift operation will be described.

Figure 6:
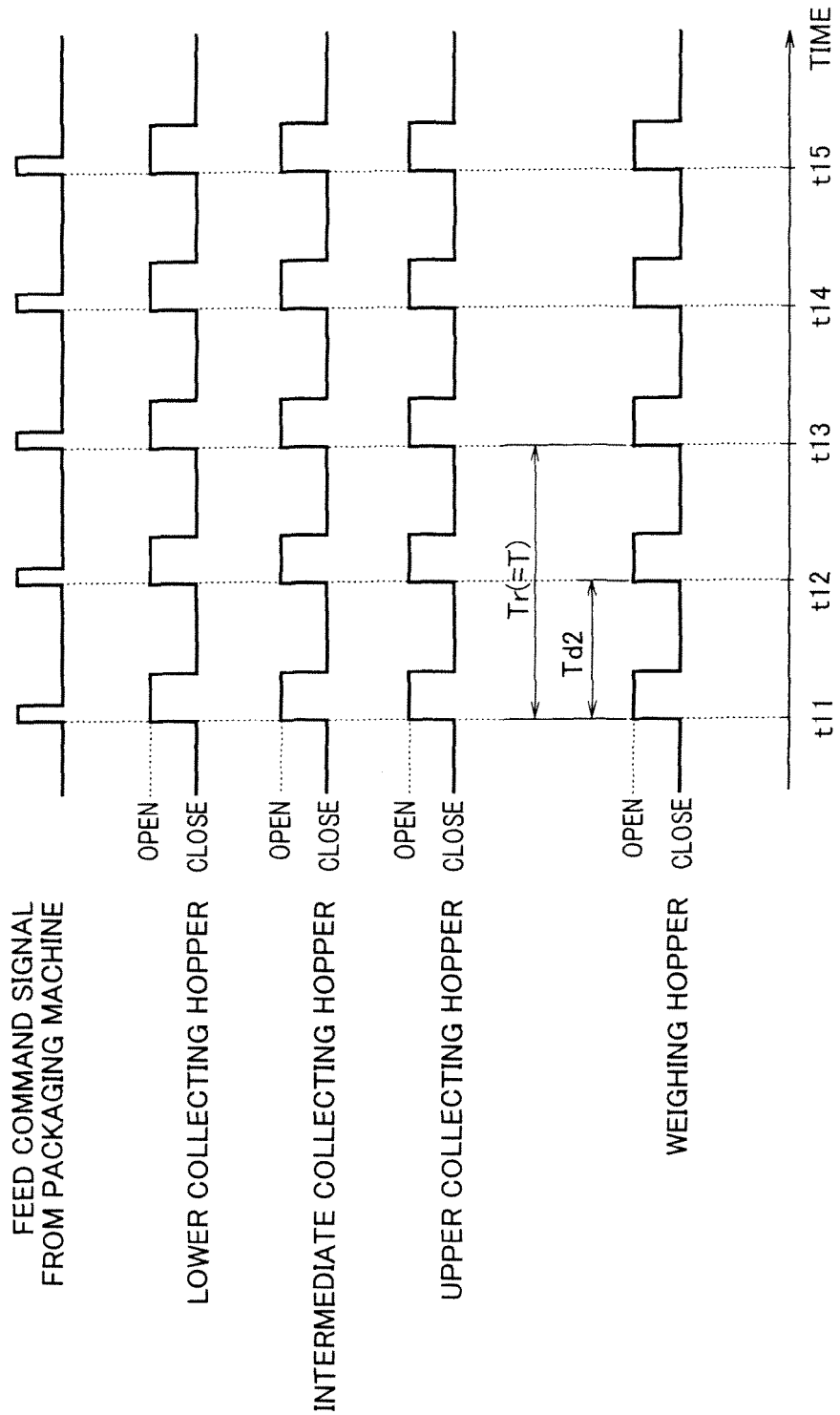
FIG. 6 is a timing chart showing opening and closing operations of gates of collecting hoppers and weighing hoppers in a case where the combination weigher of Embodiment 2 of the present invention is configured to carry out the double shift operation.

FIG. 6 is a timing chart showing the opening and closing operations of the gates of the collecting hoppers and the weighing hoppers in a case where the combination weigher of this embodiment is configured to carry out a double shift operation. In the example of FIG. 6, as in the example of FIG. 2, a case where the actual weighing cycle time Tr is equal to the ideal weighing cycle time T, that is, a case where the combination weigher is operated at a maximum speed, and the discharge cycle time Td2 associated with the weighing hoppers 4 is equal to ½ of the actual weighing cycle time Tr (=T).

In the configuration for causing the combination weigher to carry out the double shift operation, for example, the number of weighing hoppers 4 in each of the groups C and F is set to three, the number of weighing hoppers 4 in each of the groups D and E is set to four, the total number of the weighing hoppers 4 is set to fourteen, and the number of weighing hoppers 4 which would be selected in the combination process is set to four, so that a desired weighing precision is achieved. In a case where the number of weighing hoppers is thus different between the groups, the shape and size of the upper collecting chutes 6c to 6f are determined according to the number of weighing hoppers.

In the double shift operation, once in every Tr/2 time, the combination process is performed and weighing hoppers 4 belonging to the discharge combination selected in the combination process discharge the objects to be weighed. Therefore, the weighing hoppers 4 belonging to the discharge combination sequentially determined by repeating the combination process once in every Tr time discharge the objects to be weighed to the upper collecting chutes 6c to 6f. Correspondingly, once in every Tr/2 time, all the upper collecting hoppers 7a to 7f discharge the objects to be weighed simultaneously, the intermediate collecting hoppers 11a and 11b discharge the objects to be weighed simultaneously, and the lower collecting hopper 9 discharges the objects to be weighed. In this way, once in every Tr/2 time, the objects to be weighed are fed into the packaging machine.

When the combination weigher is operated continuously, the control unit 20 causes the lower collecting hopper 9 to open its gate to discharge the objects to be weighed to the packaging machine, in response to, for example, a feed command signal received from the packaging machine (time t11, t12, t13, . . . ). Whereas in this example, opening operations of the gates of the lower collecting hopper 9, the intermediate collecting hoppers 11a and 11b, the upper collecting hoppers 7c to 7f, and the weighing hoppers 4 are caused to take place at the same timings, they may take place at different timings. The control unit 20 controls the opening and closing timings of the gates of the lower collecting hopper 9, the intermediate collecting hoppers 11a and 11b, the upper collecting hoppers 7c to 7f, and the weighing hoppers 4 based on, for example, input timing of the feed command signal received from the packaging machine.

In the configuration of FIG. 6, the objects to be weighed which have been discharged from the weighing hoppers 4 by opening their gates at time t11 are gathered in the upper collecting hoppers 7c to 7f and are held therein until time t12, the objects to be weighed which have been discharged from the upper collecting hoppers 7c to 7f by opening their gates at time t12 are gathered in the intermediate collecting hoppers 11a and 11b and are held therein until time t13, and the objects to be weighed which have been discharged from the intermediate collecting hoppers 11a and 11b by opening the gates of the intermediate collecting hoppers 11a and 11b at time t13 are gathered in the lower collecting hopper 9 and are held therein until time t14, and the lower collecting hopper 9 opens its gate to discharge the objects to be weighed to the packaging machine at time t14.

By the double shift operation performed as described above, the objects to be weighed are discharged to the packaging machine once in every Tr/2 time. The discharge at a speed which is twice as high as that of the single shift operation is achieved, and therefore, the combination weigher is adapted to a packaging machine operated at a high speed.

The combination weigher of this embodiment may be configured to carry out the triple shift operation. In this case, the discharge cycle time (Td3) associated with the weighing hoppers 4 is 1/3 of the accrual weighing cycle time (Tr). In the configuration for causing the combination weigher to carry out triple shift operation, for example, the number of weighing hoppers 4 in each of the groups C and F is set to four, the number of weighing hoppers 4 in each of the groups D and E is set to five, the total number of the weighing hoppers 4 is set to eighteen, and the number of weighing hoppers 4 which would be selected in the combination process is set to four, so that desired weighing precision is achieved. In this case, also, the shape and size of the upper collecting chutes 6c to 6f may be determined according to the number of the weighing hoppers in each of the groups C to F.

In the triple shift operation, once in every Tr/3 time, the combination process is performed and weighing hoppers 4 belonging to the discharge combination selected in the combination process discharge the objects to be weighed. Therefore, the weighing hoppers 4 belonging to the discharge combination sequentially determined by repeating the combination process once in every Tr/3 time discharge the objects to be weighed to the upper collecting chutes 6c to 6f. Correspondingly, once in every Tr/3 time, all the upper collecting hoppers 7c to 7f discharge the objects to be weighed simultaneously, the intermediate collecting hoppers 11a and 11b discharge the objects to be weighed simultaneously, and the lower collecting hopper 9 discharges the objects to be weighed. In this way, once in every Tr/3 time, the objects to be weighed are fed into the packaging machine.

By the triple shift operation performed as described above, the objects to be weighed are discharged to the packaging machine once in every Tr/3 time. The discharge at a speed which is three times as high as that of the single shift operation is achieved, and therefore, the combination weigher is adapted to a packaging machine operated at a high speed.

In Embodiment 2, one collecting chute in the conventional example consists of three-stage collecting chutes, i.e., the upper, intermediate, and lower collecting chutes.

The collecting chute consists of a plurality of collecting chutes as in Embodiment 1 although the number of stages is different from that of Embodiment 1, and therefore, the same advantages as those of Embodiment 1 are attained in Embodiment 2.

As in Embodiment 1, in Embodiment 2, the upper collecting hoppers 7c to 7f are positioned higher than the collecting hopper 7 (see FIG. 10) in the configuration using one collecting chute in the conventional example. The upper collecting chutes 6c to 6f are tilted slightly gently. By reducing the vertical dimension of the upper collecting chutes 6c to 6f, a transfer distance and a transfer time of the objects to be weighed on the upper collecting chutes 6c to 6f can be reduced, and a batch time of the objects to be weighed on the upper collecting chutes 6c to 6f can be reduced, irrespective of the characteristic of the objects to be weighed or the size of the combination weigher (the size of a diameter of a circular shape in which the weighing hoppers 4 are arranged). The objects to be weighed are discharged in a state where they are lumped together to the intermediate collecting chutes 10a and 10b and the lower collecting chute 8 from the collecting hoppers 7c to 7f and 11a and 11b located thereabove as in the lower collecting chute 8 in Embodiment 1. By reducing the size of the intermediate collecting chutes 10a and 10b and the lower collecting chute 8, a transfer distance and a transfer time of the objects to be weighed on each of the collecting chutes 10a, 10b, and 8 can be reduced, and a batch time of the objects to be weighed on the intermediate collecting chutes 10a and 10b and the lower collecting chute 8 can be reduced, irrespective of the characteristic of the objects to be weighed or the size of the combination weigher. Moreover, the lower collecting hopper 9 enables the objects to be weighed to be discharged to the packaging machine in a state where they are lumped together.

Therefore, irrespective of the characteristic of the objects to be weighed, and even in a large-sized combination weigher in which a diameter of a circular shape in which the weighing hoppers 4 are arranged is large, a batch time of the objects to be weighed on each of the upper, intermediate, and lower collecting chutes can be reduced. In this case, by suppressing the batch time of the objects to be weighed on each of the upper, intermediate, and lower collecting chutes in the operation such as the single shift operation, the double shift operation or the triple shift operation to a certain time (allowable batch time) assumed for each of the operations and the collecting chutes or less, the high-speed operation is achieved without reducing an operation speed.

Figure 4:
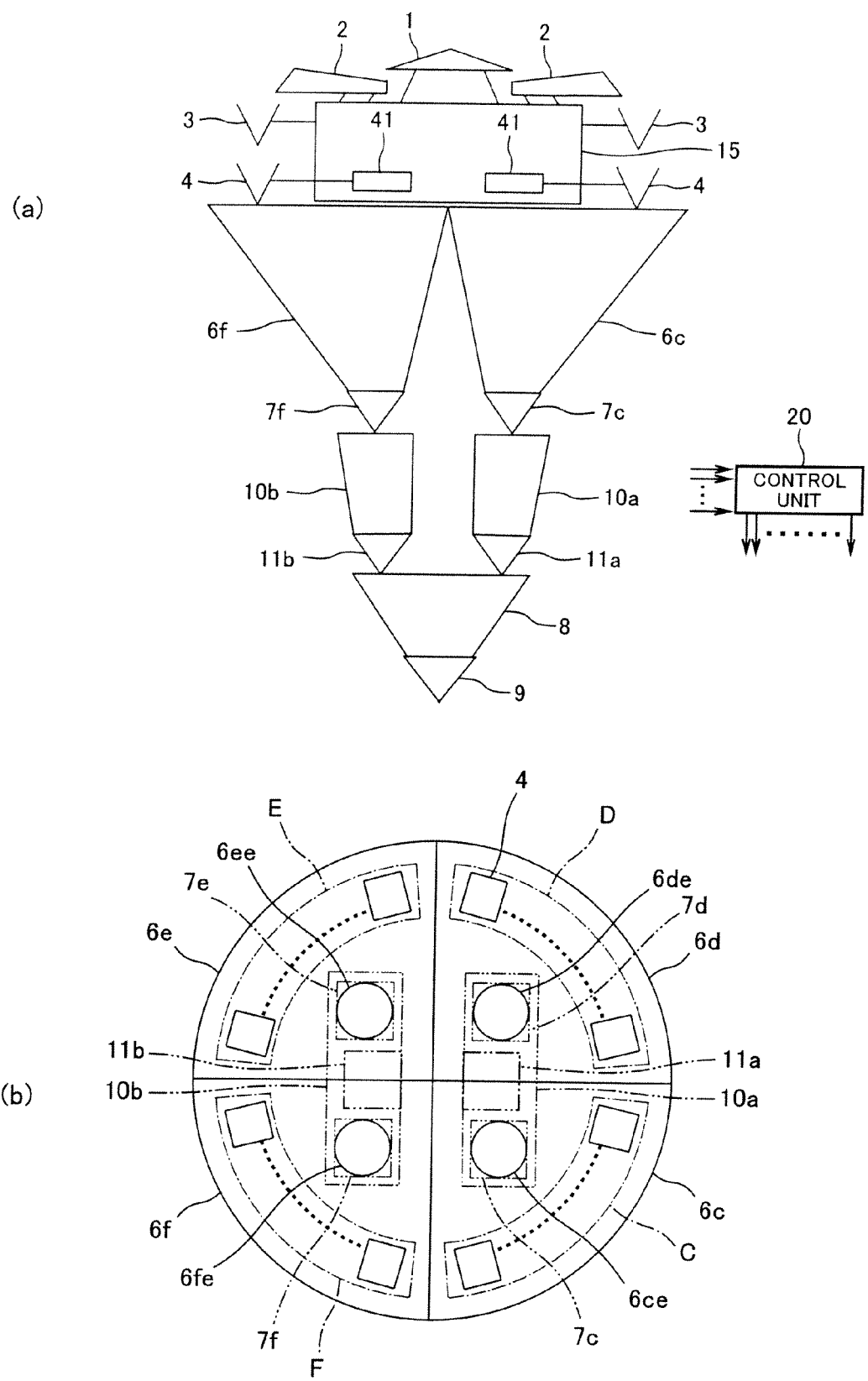
FIG. 4(a) is a schematic view of a combination weigher according to Embodiment 2 of the present invention as viewed from the side, a part of which is illustrated in cross-section.
FIG. 4(b) is a schematic view of upper collecting chutes and weighing hoppers of the combination weigher as viewed from above.

The allowable batch time assumed for each of the operations and collecting chutes is, for example, a time obtained by subtracting set time S for each collecting chute from a desired discharge cycle time (Td1, Td2, Td3) for each operation. By setting a desired discharge cycle time Td1=T (ideal weighing cycle time) in the case where the single shift operation is carried out, an operation at a maximum speed is achieved. Likewise, by setting a desired discharge cycle time Td2=T/2 in the case where the double shift operation is carried out, or by setting a desired discharge cycle time Td3=T/3 in the case where the triple shift operation is carried out, an operation at a maximum speed is achieved. In the configuration of FIG. 4, for example, the set time S for each of the upper collecting chute 6c to 6f is a time during which the upper collecting hoppers 7c to 7f open their gates to discharge the objects to be weighed, the set time S for the intermediate collecting chutes 10a and 10b is a time during which the intermediate collecting hoppers 11a and 11b open their gates to discharge the objects to be weighed, and the set time S for the lower collecting chute 8 is a time during which the lower collecting hopper 9 opens its gate to discharge the objects to be weighed. As described later, in a case where the lower collecting hopper 9 is not provided, the set time S for the lower collecting chute 8 may be set to a predetermined time which does not impede an operation of the packaging machine disposed therebelow. For the batch time of the objects to be weighed on each of the upper, intermediate, and lower collecting chutes, a test (e.g., test using a test model) may be conducted using the objects to be weighed which are weighed in this combination weigher, and the collecting chutes and others are designed and manufactured so that a batch time of the objects to be weighed is an allowable batch time or less. To this end, the upper collecting chutes 6c to 6f, the intermediate collecting chutes 10a and 10b, and the lower collecting chute 8 are configured as in the case where the upper collecting chutes 6a and 6b, and the lower collecting chute 8 are configured, in Embodiment 1, for the cases of the configuration for causing the combination weigher to perform the single shift operation, the configuration for causing the combination weigher to perform the double shift operation, and the configuration for causing the combination weigher to carry out the triple shift operation.

Since the transfer distance of the objects to be weighed which slide down on each of the upper collecting chutes 6c to 6f, the intermediate collecting chutes 10a and 10b, and the lower collecting chute 8 is short, a maximum speed of the objects to be weighed sliding down is suppressed to a low one, so that impact generated when the objects to be weighed collide against each other or generated due to the collision of the objects to be weighed against the inner walls of the collecting hoppers 7c to 7f, 11a, 11b, and 9 which occurs when the objects to be weighed enter the collecting hoppers 7c to 7f, 11a, 11b, and 9 is made small. As a result, damage to the objects to be weighed can be prevented.

In Embodiment 2, the collecting chute consist of three-stage collecting chutes and therefore is applicable to a larger-sized combination weigher or a combination weigher using the objects to be weighed having a characteristic which tends to increase a batch time thereof on the collecting chute, as compared to Embodiment 1 in which the collecting chute consists of two-stage collecting chutes.

The size of the upper collecting hoppers 7c, 7d, 7e, and 7f can be reduced, by configuring the setting in the combination process so that at least one weighing hopper 4 is selected without fail to make up of a discharge combination from two or more groups (in this case, two groups or three groups) among the groups C, D, E, and F of the weighing hoppers 4 respectively corresponding to the upper collecting chutes 6c, 6d, 6e, and 6f or a maximum number of the weighing hoppers 4 selected from each of the groups C, D, E, and F is limited to less than the number of the weighing hoppers 4 which would be selected. Likewise, the size of the intermediate collecting hoppers 11a and 11b can be reduced by configuring the setting so that at least one weighing hopper 4 is selected without fail to make up of a discharge combination from among both groups composed of a first group consisting of the groups C and D and a second group consisting of the groups E and F, or a maximum number of the weighing hoppers 4 selected from each of the two groups is limited to the number of weighing hoppers which would be selected.

In this embodiment, the lower collecting chute 8 may be omitted in a case where the intermediate collecting hoppers 11a and 11b are capable of directly feeding the objects to be weighed to the upper part opening of the lower collecting hopper 9 by, for example, increasing the upper part opening of the lower collecting hopper 9. Likewise, the intermediate collecting chutes 10a and 10b may be omitted in a case where the upper collecting hoppers 7c, 7d, 7e, and 7f are capable of directly feeding the objects to be weighed to the upper part openings of the intermediate collecting hoppers 11a and 11b by, for example, increasing the upper part openings of intermediate collecting hoppers 11a and 11b.

The lower collecting hopper 9 may be omitted in a case where a batch length of the objects to be weighed which are discharged from the intermediate collecting hoppers 11a and 11b is small, a batch length of the objects to be weighed which are discharged from the bottom part discharge outlet of the lower collecting chute 8 can be made small, and the packaging operation of the packaging machine is not impeded, without the lower collecting hopper 9. In this case, because of the absence of the lower collecting hopper 9, a structure is simplified, and a control therefor is dispensed with. The control unit 20 is configured to cause the intermediate collecting hoppers 11a and 11b to discharge the objects to be weighed, in response to, for example, a feed command signal from the packaging machine.

Furthermore, the lower collecting chute 8 and the lower collecting hopper 9 may be omitted in a case where the intermediate collecting hoppers 11a and 11b are capable of directly feeding the objects to be weighed to one packaging machine feed inlet. For example, in a case where a packaging machine feed inlet has a widened upper part and its opening diameter is large, the objects to be weighed which are discharged from the intermediate collecting hoppers 11a and 11b can be directly fed to the packaging machine feed inlet. In this case, because of the absence of the lower collecting chute 8 and the lower collecting hopper 9, a structure is simplified, and a control for the lower collecting hopper 9 is dispensed with, as in the configuration in which the lower collecting hopper 9 is omitted.

Whereas in Embodiment 2, the upper collecting chute consists of four collecting chutes, it may be configured to consist of two or more collecting chutes. In this case, likewise, the upper collecting hoppers are provided at bottom part discharge outlets of the upper collecting chutes. In a case where the upper collecting chute is configured to consist of two upper collecting chutes each having an upper part opening of a sector shape (circular-arc shape) with a central angle of 180 degrees as shown in FIG. 1, for example, three-stage collecting chutes are provided in such a manner that two intermediate collecting chutes are provided to respectively correspond to the two upper collecting hoppers respectively provided at the upper collecting chutes. In a case where the upper collecting chute is configured to consist of three collecting chutes, three-stage collecting chutes are provided in such a manner that one intermediate collecting chute is provided to correspond to the two upper collecting hoppers from among the three upper collecting hoppers respectively provided at the three upper collecting chutes and one intermediate collecting chute is provided to correspond to the remaining upper collecting hopper. In any case, it is desired that the discharge outlet of the collecting chute positioned lower be closer to a location just above the packaging machine feed inlet.

As already described in Embodiment 1, in the configuration in which the upper collecting chute consists of three or more collecting chutes, the upper part opening of each upper collecting chute can be formed to have a sector shape with a central angle of 180 degrees or less. This makes it easy to increase the inclination angle of each upper collecting chute so that the transfer distance and the transfer time of the objects to be weighed on each upper collecting chute can be reduced, and a batch time of the objects to be weighed thereon can be reduced.

Whereas the collecting chute consists of two-stage collecting chutes, i.e., upper and lower collecting chutes in Embodiment 1, and consist of three-stage collecting chutes, i.e., upper, intermediate, and lower collecting chutes in Embodiment 2, it may be configured to consist of four or more stage collecting chutes.

As should be clearly understood from the above, the number of stages of the collecting chute in the vertical direction and the number of collecting chutes in each stage are set as desired according to the characteristic of the objects to be weighed or the size of the diameter of the circular shape in which the weighing hoppers 4 are arranged, etc.

Whereas in Embodiments 1 and 2, all the weighing hoppers 4 are arranged in the circular shape, this configuration is exemplary, they may be arranged in an annular shape including an oval shape, and polygonal shapes such as a square shape or a rectangular shape, instead of the circular shape, and the feeding hoppers 3, the linear feeders 3, the upper collecting chutes and others may be provided, according to the shape in which these components are arranged.

In Embodiment 3 below, a configuration in which the weighing hoppers 4 are arranged in a linear shape will be described.

Embodiment 3

FIG. 7(a) is a schematic view of a combination weigher according to Embodiment 3 of the present invention as viewed from above, and FIG. 7(b) is a schematic view of the combination weigher as viewed from the front. In FIG. 7(b), the linear feeders 2 are not illustrated.

The combination weigher is configured in such a manner that the plurality of feeding hoppers 3 and the plurality of weighing hoppers 4 are arranged in a linear shape so that each feeding hopper 3 corresponds to an associated one of the weighing hoppers 4. Each weighing hopper 4 is attached with a weight sensor 41 (see FIG. 1) for measuring the weight of the objects to be weighed inside the weighing hopper 4. Each weight sensor 41 outputs a measured value to the control unit 20. To each feeding hopper 3 disposed just above the associated weighing hopper 4, the linear feeder 2 located thereabove feeds the objects to be weighed. To each linear feeder 2, a feeding means (not shown) feeds the objects to be weighed.

In this embodiment, below the weighing hoppers 4 arranged in the linear shape, two upper collecting chutes 6g and 6h each having a substantially inverted truncated quadrangular pyramid shape is disposed. The weighing hoppers 4 in a group G are weighing hoppers 4 disposed above the upper collecting chute 6g to correspond to the upper collecting chute 6g. The objects to be weighed which have been discharged from the weighing hoppers 4 in the group G slide down on the upper collecting chute 6g. Likewise, the weighing hoppers 4 in a group H are weighing hoppers 4 disposed above the upper collecting chute 6h to correspond to the upper collecting chute 6h. The objects to be weighed which have been discharged from the weighing hoppers 4 in the group H slide down on the upper collecting chute 6h. In this case, although the shape of the upper collecting chutes 6g and 6h is different from that shown in FIG. 1, the upper collecting hoppers 7a and 7b provided at the discharge outlets of the bottom parts of the upper chute collecting chutes 6g and 6h, and the lower collecting chute 8 and the lower collecting hopper 9 located under the upper collecting hoppers 7a and 7b have substantially the same configuration.

The control unit 20 controls the operation of the entire combination weigher and performs the combination process as in Embodiment 1 to determine weighing hoppers 4 belonging to a discharge combination from among the weighing hoppers 4 belonging to the group G and the group H. The operation of the combination weigher is identical to that in the configuration of FIG. 1 (excluding the dispersion feeder 1). The combination weigher can be configured to perform the single shift operation, the double shift operation, and the triple shift operation as in Embodiment 1.

In this embodiment, if the arrangement spacing of the weighing hoppers 4 is the same and the total number of weighing hoppers 4 is equal, the length of the upper collecting chutes 6g and 6h in the direction in which the weighing hoppers 4 are arranged can be reduced substantially by half as compared to the conventional combination weigher including the single collecting chute. The length of the lower collecting chute 8 can be made shorter than that of the conventional collecting chute. Therefore, the transfer distance and the transfer time of the objects to be weighed on each of the upper collecting chutes 6g and 6h and the lower collecting chute 8 can be reduced, and a batch time of the objects to be weighed on each of the upper and lower collecting chutes 6g, 6h, and 8 can be reduced even when using the objects to be weighed having a characteristic which tends to increase a batch time thereof on the collecting chute and even in the combination weigher including weighing hoppers whose total number is large. Therefore, as in Embodiment 1, the upper and lower collecting chutes 6g, 6h, and 8 are configured so that the batch time of the objects to be weighed on each of the upper and lower collecting chutes 6g, 6h, and 8 is allowable batch time or less according to each of cases including the configuration for causing the combination weigher to perform the single shift operation, the configuration for causing the combination weigher to perform the double shift operation, and the configuration for causing the combination weigher to perform the triple shift operation.

As should be appreciated from the above, the batch times of the objects to be weighed on each of the upper and lower collecting chutes can be reduced, irrespective of the characteristic of the objects to be weighed or the total number of the weighing hoppers 4, so that the high-speed operation is achieved. Since the transfer distance of the objects to be weighed which slide down on each of the upper collecting chutes 6g and 6h and the lower collecting chute 8 is short, a maximum speed of the objects to be weighed sliding down is suppressed to be a low one, so that impact generated when the objects to be weighed collide against each other or generated due to the collision of the objects to be weighed against the inner walls of the collecting hoppers 7a, 7b and 9 which occurs when the objects to be weighed enter the collecting hoppers 7a, 7b and 9 is made small. As a result, damage to the objects to be weighed can be prevented.

In Embodiment 3, as in Embodiment 1, the size of the upper collecting hoppers 7a and 7b can be reduced, by configuring the setting in the combination process so that at least one weighing hopper 4 is selected without fail to make up of a discharge combination from each of the two groups G and H or a maximum number of the weighing hoppers 4 selected from each of the groups G and H is limited to less than the number of the weighing hoppers 4 which would be selected.

Figure 7:
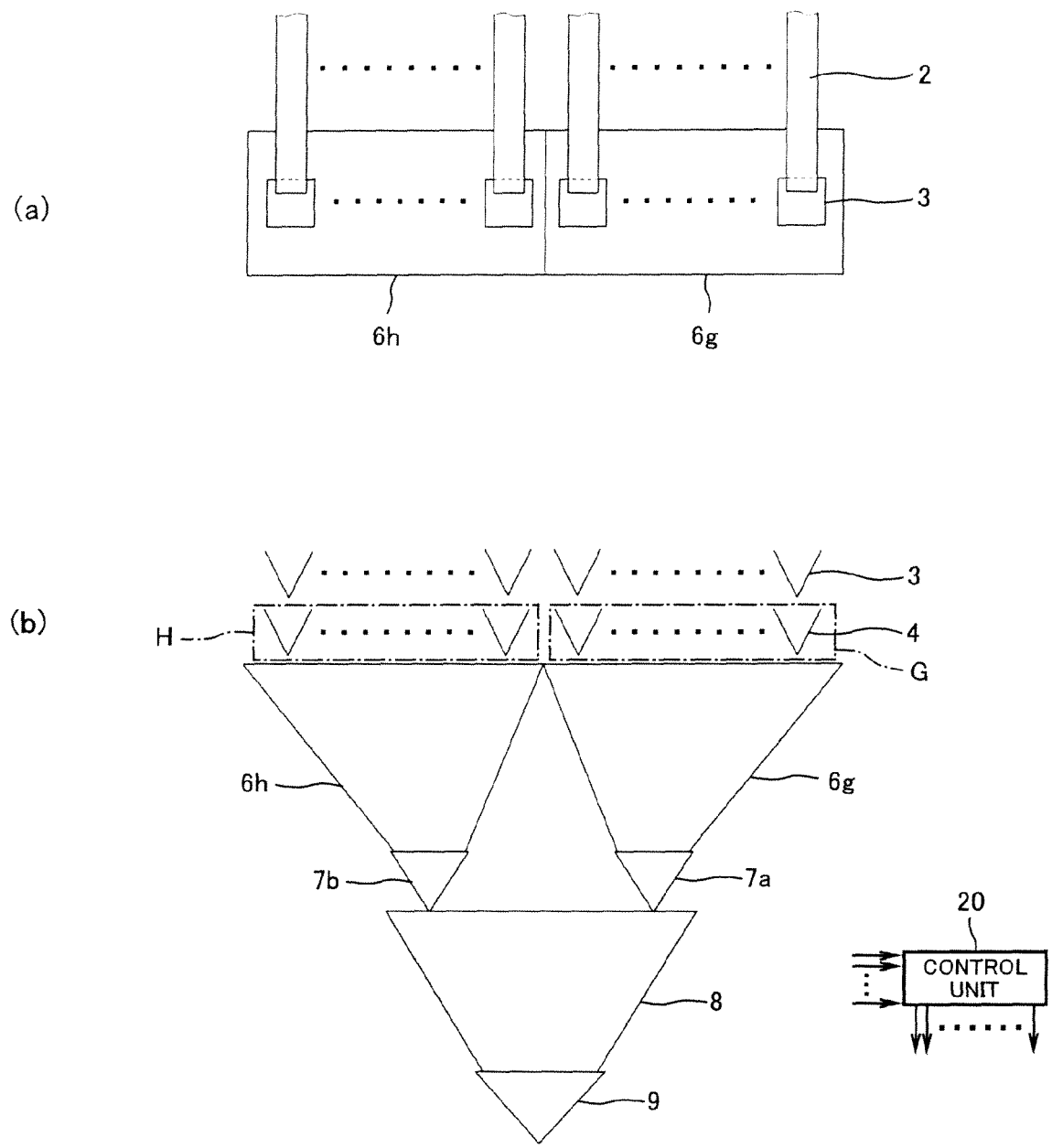
FIG. 7(a) is a schematic view of a combination weigher according to Embodiment 3 of the present invention as viewed from above.
FIG. 7(b) is a schematic view of the combination weigher as viewed from the front.

Whereas the weighing hoppers 4 are arranged in one linear line as shown in FIG. 7, they may be arranged in plural lines (e.g., two lines), and each of the groups G and H may consist of plural-line weighing hoppers 4. Alternatively, the weighing hoppers 4 may be divided into three or more groups, and the upper collecting chutes may be provided to respectively correspond to these groups. In further alternative, the collecting chute may consist of collecting chutes in three or more stages. Thus, in the configuration in which the weighing hoppers 4 are arranged in one linear-line shape or in plural linear-line shape, the number of stages of the collecting chutes in the vertical direction and the number of collecting chutes in each stage are set as desired according to the characteristic of the objects to be weighed or the length of the arrangement shape of the weighing hoppers 4.

Whereas in the above embodiments, the objects to be weighed which have been discharged from the combination weigher are fed into one packaging machine feed inlet, for example, two packaging machines or a twin-type packaging machine having two feed inlets for the objects to be weighed may be disposed under the combination weigher so that the objects to be weighed which have been discharged from the combination weigher are fed into two packaging machine feed inlets (first and second packaging machine feed inlets) alternately. The configuration in this case will be described with reference to FIG. 8.

Figure 8:
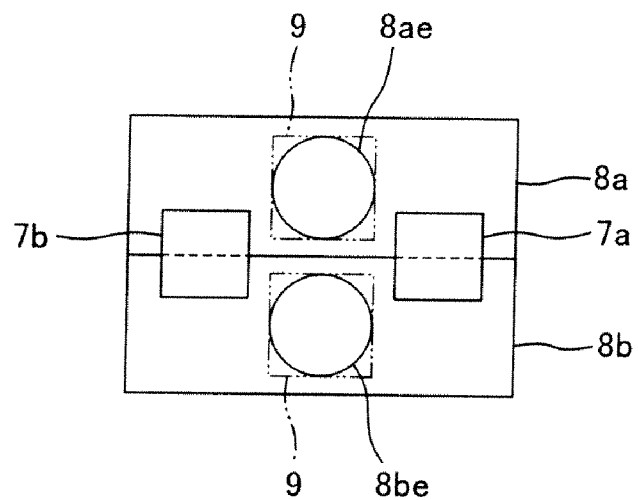
FIG. 8 is a plan view showing a configuration of a lower collecting chute in a case where the combination weigher is configured to discharge the objects to be weighed and feed the objects to be weighed to two packaging machine feed inlets.

FIG. 8 is a plan view showing a configuration of a lower collecting chute in a case where the combination weigher is configured to discharge the objects to be weighed and feed the objects to be weighed to two packaging machine feed inlets alternately.

For example, in the configurations of FIGS. 1 and 7 in which the collecting chutes are provided in two stages, two lower collecting chutes 8a and 8b provided with the collecting hoppers 9 at discharge outlets 8ae and 8be thereof as shown in FIG. 8 is used, and each of the upper collecting hoppers 7a and 7b is configured to selectively to discharge the objects to be weighed to the lower collecting chute 8a or 8b, instead of one lower collecting chute 8 and one collecting hopper 9 provided under the two upper collecting hoppers 7a and 7b. The objects to be weighed which have been discharged from the lower collecting hopper 9 provided at the discharge outlet 8ae of the lower collecting chute 8a are fed into the first packaging machine feed inlet, while the objects to be weighed which have been discharged from the lower collecting hopper 9 provided at the discharge outlet 8be of the lower collecting chute 8b are fed into the second packaging machine feed inlet. In this case, the control unit 20 controls the upper collecting hoppers 7a and 7b so that the upper collecting hoppers 7a and 7b discharge the objects to be weighed to the two lower collecting chutes 8a and 8b alternately and discharge the objects to be weighed to the same lower collecting chute simultaneously, every time the weighing hoppers 4 discharge the objects to be weighed. In this case, the two lower collecting hoppers 9 alternately perform discharge operation according to the event that the upper collecting hoppers 7a and 7b discharge the objects to be weighed alternately to the two lower collecting chutes 8a and 8b.

In the configuration in which the collecting chutes are provided in three or more stages as shown in FIG. 4, the objects to be weighed can be fed into two packaging machine feed inlets in the same manner. To be specific, in a case where the collecting chutes are provided in m (m is three or more) stages, all k-th (k is any numeric value from 1 to m−1) stage collecting hoppers provided at discharge outlets of the k-th stage collecting chutes, among first-stage (uppermost stage) to m-th stage (lowermost stage) collecting chutes, are each configured to discharge the objects to be weighed selectively in either one of two directions, and two sets of (k+1)-th stage to m-th stage collecting chutes and collecting hoppers are provided to form paths through which the objects to be weighed which have been discharged from the k-th stage collecting hoppers in two directions alternately are introduced into the two packaging machine feed inlets alternately.

If the two packaging machine feed inlets are located in close proximity to each other in the configuration in which the collecting chutes are provided in two or three stages, the lowermost collecting hopper may be configured to discharge the objects to be weighed selectively in one of two directions (two packaging machine feed inlets), and the control unit 20 may be configured to control the lowermost collecting hopper so that the lowermost collecting hopper discharges the objects to be weighed alternately to the two packaging machine feed inlets, instead of using the above described configuration (e.g., configuration shown in FIG. 8.)

Whereas the above embodiments describe that only weighing hoppers 4 are used as combination hoppers (hoppers which participate in combination calculation) holding the objects to be weighed whose measured values are used in combination calculation, such combination hoppers are merely exemplary. FIGS. 9(a), 9(b), 9(c), and 9(d) are views schematically showing another examples of hoppers such as combination hoppers. A collecting chute 6X in FIGS. 9(a) to 9(d) corresponds to the upper collecting chutes (6a to 6h) described in the above embodiments.

Figure 9:
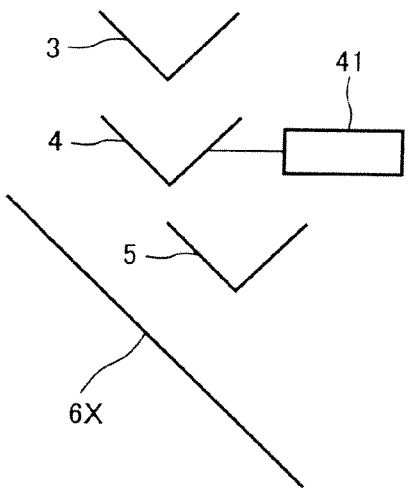
FIGS. 9(a) to 9(d) are schematic views showing another example of hoppers used in the combination weighers of the Embodiments of the present invention.
Figure 9:
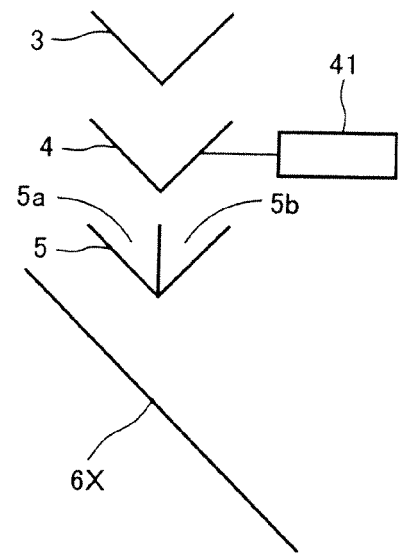
Figure 9:
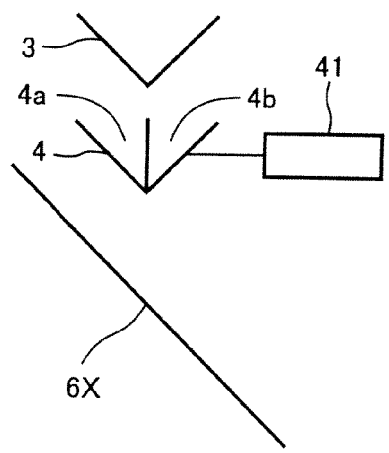
Figure 9:
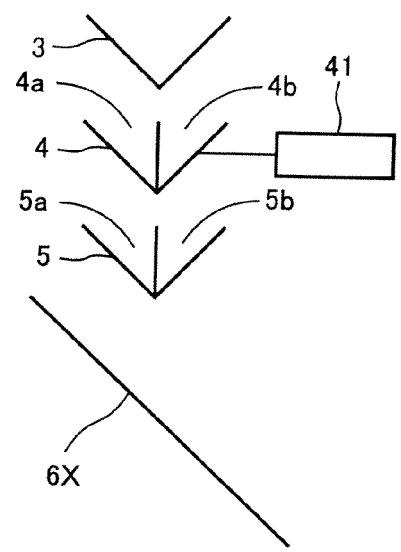

For example, as shown in FIG. 9(a), a memory hopper 5 may be disposed obliquely below each weighing hopper 4 and may participate in combination calculation. In this case, each weighing hopper 4 is capable of discharging the objects to be weighed selectively to the collecting chute 6X or to the memory hopper 5. When the memory hopper 5 is empty, the weighing hopper 4 feeds the objects to be weighed to the memory hopper 5. The control unit 20 performs the combination process to determine a combination (discharge combination) of hoppers which will discharge the objects to be weighed which are selected from among the plurality of weighing hoppers 4 and the plurality of memory hoppers 5, and causes the hoppers corresponding to the discharge combination to discharge the objects to be weighed onto the collecting chute 6X. As the weight of the objects to be weighed inside the memory hopper 5 which is used in the combination calculation in the combination process, the weight obtained by measurement in the weighing hopper 4 located thereabove is used.

As shown in FIG. 9(b), each memory hopper 5 may have two accommodating chambers 5a and 5b. In this case, the weighing hopper 4 is capable of discharging the objects to be weighed selectively to the accommodating chamber 5a or to the accommodating chamber 5b of the memory hopper 5, and is configured not to discharge the objects to be weighed to the collecting chute 6X. The two accommodating chambers 5a and 5b of each memory hopper 5 are each capable of discharging the objects to be weighed independently. Combination calculation is performed using weights of the objects to be weighed inside the accommodating chambers 5a and 5b of each memory hopper 5. The accommodating chambers 5a and 5b participate in combination calculation but the weighing hopper 4 does not participate in the combination calculation. As the weights of the objects to be weighed inside the accommodating chambers 5a and 5b, weights obtained by measurement in the weighing hopper 4 located thereabove are used. Each weighing hopper 4 can participate in the combination calculation provided that the weighing hopper 4 and the accommodating chamber 5a or 5b of the associated memory hopper 5 are selected simultaneously to form a combination. For example, when the weighing hopper 4 and the accommodating chamber 5a of the associated memory hopper 5 are selected simultaneously, the objects to be weighed inside the weighing hopper 4 are discharged onto the collecting chute 6X through the accommodating chamber 5a.

As shown in FIG. 9(c), each weighing hopper 4 may have two weighing chambers 4a and 4b. In this case, the feeding hopper 3 is capable of discharging the objects to be weighed selectively to the weighing chamber 4a or to the weighing chamber 4b of the weighing hopper 4, and the weighing chambers 4a and 4b of the weighing hopper 4 are capable of independently discharging the objects to be weighed. The combination calculation is performed using the weights of the objects to be weighed inside the weighing chambers 4a and 4b in each weighing hopper 4, and the weighing chambers 4a and 4b participate in combination calculation. In the weighing hopper 4 having the two weighing chambers 4a and 4b, when only one weighing chamber, for example, only the weighing chamber 4a holds the objects to be weighed, the weight of the objects to be weighed inside the weighing chamber 4a is measured by the weight sensor 41. When the weighing chamber 4b is fed with the objects to be weighed, the weight sensor 41 measures the total weight of the objects to be weighed inside the two weighing chambers 4a and 4b. The control unit 20 calculates the weight of the objects to be weighed inside the weighing chamber 4b by subtracting the weight of the objects to be weighed inside the weighing chamber 4a from the total weight of the objects to be weighed inside the two weighing chambers 4a and 4b. Thus, the control unit 20 performs the combination calculation.

As shown in FIG. 9(d), each weighing hopper 4 may have two weighing chambers 4a and 4b, and the memory hopper 5 having the two accommodating chambers 5a and 5b respectively corresponding to the weighing chambers 4a and 4b of the weighing chamber 4 may be provided below the weighing hopper 4. In this case, the feeding hopper 3 is capable of discharging the objects to be weighed selectively to the weighing chamber 4a or to the weighing chamber 4b of the weighing hopper 4. The objects to be weighed inside the weighing chamber 4a of the weighing hopper 4 are sent out to the accommodating chamber 5a of the memory hopper 5, while the objects to be weighed inside the weighing chamber 4b of the weighing hopper 4 are sent out to the accommodating chamber 5b of the memory hopper 5. For example, the combination calculation is performed using the weights of the objects to be weighed inside the accommodating chambers 5a and 5b of the memory hopper 5, and the accommodating chambers 5a and 5b participate in the combination calculation, but the weighing hopper 4 does not participate in the combination calculation. As the weights of the objects to be weighed inside the accommodating chambers 5a and 5b, the weights obtained by measurement in and calculation for the weighing chambers 4a and 4b in the weighing hopper 4 located thereabove are used. The weighing chambers 4a and 4b of the weighing hopper 4 can participate in combination calculation provided that the weighing chamber 4a or 4b and the associated accommodating chamber 5a or 5b are selected simultaneously to form a combination. For example, when the associated weighing chamber 4a and the associated accommodating chamber 5a are selected simultaneously, the objects to be weighed inside the weighing chamber 4a are discharged onto the collecting chute 6X through the accommodating chamber 5a.

In addition to the above, the configuration of the hoppers such as the combination hoppers may be changed in various ways. In each of the embodiments, the objects to be weighed of the same kind are fed to all the combination hoppers (e.g., weighing hoppers 4) included in the combination weigher.

Moreover, in the above embodiments, the control unit 20 is not limited to being configured as the single control apparatuses, but instead may be each configured to include a plurality of control apparatuses which are disposed in a distributed manner and co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A combination weigher of the present invention is useful as a combination weigher which is coupled to a packaging machine operated at a high speed, etc.

The invention claimed is:

1. A combination weigher comprising:
a plurality of combination hopper groups each including a plurality of combination hoppers which are fed with objects to be weighed;
a plurality of upper collecting chutes which are disposed below the combination hopper groups to respectively correspond to the combination hopper groups and are configured to gather the objects to be weighed which have been discharged from the combination hoppers and to discharge the objects to be weighed from discharge outlets at bottom parts thereof;
a plurality of upper collecting hoppers which are respectively provided at the discharge outlets of the plurality of upper collecting chutes to respectively correspond to the upper collecting chutes and are configured to hold the objects to be weighed which have been discharged from the discharge outlets of the upper collecting chutes respectively corresponding to the plurality of upper collecting hoppers and then to discharge the objects to be weighed; and
a control means configured to repeatedly perform a combination process in which combination calculation is performed based on weights of the objects to be weighed which are held in the combination hoppers belonging to the plurality of combination hopper groups to determine one combination of the combination hoppers holding the objects to be weighed whose total weight falls within a predetermined weight range and determine the one combination as one discharge combination, a first discharge process in which the combination hoppers belonging to the one discharge combination determined in the combination process respectively discharge the objects to be weighed, and a second discharge process in which the plurality of upper collecting hoppers discharge the objects to be weighed simultaneously, to discharge the objects to be weighed which have been discharged respectively from the combination hoppers forming the one discharge combination and are held in the upper collecting hoppers corresponding to a combination hopper group to which the combination hoppers of the one discharge combination belong.

2. The combination weigher according to claim 1, being configured to feed, to the same packaging machine feed inlet, the objects to be weighed which have been discharged from all of the upper collecting hoppers.

3. The combination weigher according to claim 2, further comprising:
a lower collecting hopper which is disposed below the upper collecting hoppers, and is configured to hold the objects to be weighed which have been discharged from all of the upper collecting hoppers and to then discharge the objects to be weighed to the packaging machine feed inlet.

4. The combination weigher according to claim 2, further comprising:
a plurality of intermediate collecting hoppers which are disposed below the upper collecting hoppers and are configured to hold the objects to be weighed which have been discharged from respective of the plurality of upper collecting hoppers and to then discharge the objects to be weighed; and
a lower collecting hopper which is provided below the intermediate collecting hoppers and is configured to hold the objects to be weighed which have been discharged from all of the intermediate collecting hoppers and to then discharge the objects to be weighed to the packaging machine feed inlet.

5. The combination weigher according to claim 1, further comprising:
a collecting discharge means which gathers the objects to be weighed which have been discharged from the plurality of upper collecting hoppers and to discharge the objects to be weighed.

6. The combination weigher according to claim 5, wherein the collecting discharge means includes a lower collecting chute which is disposed below the upper collecting hoppers and is configured to gather the objects to be weighed which have been discharged from all of the upper collecting hoppers and to discharge the objects to be weighed from a discharge outlet at a bottom part thereof to a packaging machine feed inlet.

7. The combination weigher according to claim 5,
wherein the collecting discharge means includes a plurality of intermediate collecting chutes which are disposed below the upper collecting hoppers and are configured to gather the objects to be weighed which have been discharged from respective of the plurality of upper collecting hoppers and to discharge the objects to be weighed from discharge outlets at bottom parts thereof;
a plurality of intermediate collecting hoppers which are respectively provided at the discharge outlets of the intermediate collecting chutes and are configured to hold the objects to be weighed which have been discharged from the discharge outlets of the intermediate collecting chutes and to then discharge the objects to be weighed; and
a lower collecting chute which is disposed below the intermediate collecting hoppers and is configured to gather the objects to be weighed which have been discharged from all of the intermediate collecting hoppers and to discharge the objects to be weighed from a discharge outlet at a bottom part thereof to a packaging machine feed inlet.

8. The combination weigher according to claim 6, wherein the collecting discharge means further includes a lower collecting hopper which is provided at a discharge outlet of the lower collecting chute and is configured to hold the objects to be weighed which have been discharged from the discharge outlet of the lower collecting chute and to then discharge the objects to be weighed.

9. The combination weigher according to claim 5, wherein the collecting discharge means includes second to p-th (p: integer of four or larger) plural-stage collecting chutes which are disposed below a first-stage collecting chute consisting of the upper collecting chutes, and collecting hoppers which are respectively provided at discharge outlets of bottom parts of second to (p−1)-th stage collecting chutes and are configured to hold the objects to be weighed which have been discharged from discharge outlets at bottom parts of the collecting chutes and to then discharge the objects to be weighed; wherein a q-th (q: integer in a range of 2 to p) stage collecting chute is configured to gather the objects to be weighed which have been discharged from the collecting hoppers provided at discharge outlets of the (q−1)-th stage plural collecting chutes and to discharge the objects to be weighed from a discharge outlet at a bottom part thereof; the combination weigher being configured to feed, into a packaging machine feed inlet, the objects to be weighed which have been discharged from a discharge outlet at a bottom part of the p-th stage collecting chute.

10. The combination weigher according to claim 9, wherein
the collecting discharge means further includes a collecting hopper provided at a discharge outlet of the p-th stage collecting chute, and is configured to hold the objects to be weighed which have been discharged from the p-th stage collecting chute and to then discharge the objects to be weighed.

11. The combination weigher according to claim 5, wherein
the upper collecting hoppers are configured to discharge the objects to be weighed selectively in a first direction or in a second direction;
wherein the collecting discharge means includes:
a first lower collecting chute which is disposed below the upper collecting hoppers and is configured to gather the objects to be weighed which have been discharged from all of the upper collecting hoppers in the first direction and to discharge the objects to be weighed from a discharge outlet at a bottom part thereof to a first packaging machine feed inlet; and
a second lower collecting chute which is disposed below the upper collecting hoppers and is configured to gather the objects to be weighed which have been discharged from all of the upper collecting hoppers in the second direction and to discharge the objects to be weighed from a discharge outlet at a bottom part thereof to a second packaging machine feed inlet; and wherein
the control means is configured to cause the plurality of upper collecting hoppers to discharge the objects to be weighed in the first direction and in the second direction alternately in the second discharge process performed repeatedly.

12. The combination weigher according to claim 5, wherein
the upper collecting hoppers are configured to discharge the objects to be weighed selectively in a first direction or in a second direction;
wherein the collecting discharge means includes:
a plurality of first intermediate collecting chutes which are disposed below the upper collecting hoppers and are configured to gather the objects to be weighed which have been discharged from respective of the plurality of upper collecting hoppers in the first direction and to discharge the objects to be weighed from discharge outlets at bottom parts thereof;
a plurality of second intermediate collecting chutes which are disposed below the upper collecting hoppers and are configured to gather the objects to be weighed which have been discharged from respective of the plurality of upper collecting hoppers in the second direction and to discharge the objects to be weighed from discharge outlets at bottom parts thereof;
a plurality of first intermediate collecting hoppers which are respectively provided at discharge outlets of the first intermediate collecting chutes, and are configured to hold the objects to be weighed which have been discharged from the discharge outlets of the first intermediate collecting chutes, and to then discharge the objects to be weighed;
a plurality of second intermediate collecting hoppers which are respectively provided at discharge outlets of the second intermediate collecting chutes, and are configured to hold the objects to be weighed which have been discharged from the discharge outlets of the second intermediate collecting chutes, and to then discharge the objects to be weighed;
a first lower collecting chute which is disposed below the first intermediate collecting hoppers and is configured to gather the objects to be weighed which have been discharged from all of the first intermediate collecting hoppers and to discharge the objects to be weighed from a discharge outlet at a bottom part thereof to a first packaging machine feed inlet; and
a second lower collecting chute which is disposed below the second intermediate collecting hoppers and is configured to gather the objects to be weighed which have been discharged from all of the second intermediate collecting hoppers and to discharge the objects to be weighed from a discharge outlet at a bottom part thereof to a second packaging machine feed inlet; and wherein
the control means is configured to cause all of the upper collecting hoppers to discharge the objects to be weighed in the first direction and in the second direction alternately in the second discharge process performed repeatedly.

13. The combination weigher according to claim 5, wherein
the collecting discharge means includes
a plurality of intermediate collecting chutes which are disposed below the upper collecting hoppers and are configured to gather the objects to be weighed which have been discharged from respective of the plurality of upper collecting hoppers and to discharge the objects to be weighed from discharge outlets at bottom parts thereof;
a plurality of intermediate collecting hoppers which are respectively provided at discharge outlets of the intermediate collecting chutes and are configured to hold the objects to be weighed which have been discharged from the discharge outlets of the intermediate collecting hoppers and to then to discharge the objects to be weighed selectively in a first direction or in a second direction;
a first lower collecting chute which is disposed below the intermediate collecting hoppers and is configured to gather the objects to be weighed which have been discharged in the first direction from all of the intermediate collecting hoppers and to discharge the objects to be weighed from a discharge outlet at a bottom part thereof to a first packaging machine feed inlet; and
a second lower collecting chute which is disposed below the intermediate collecting hoppers and is configured to gather the objects to be weighed which have been discharged in the second direction from all of the intermediate collecting hoppers and to discharge the objects to be weighed from a discharge outlet at a bottom part thereof to a second packaging machine feed inlet; and wherein
the control means is configured to cause all of the intermediate collecting hoppers to discharge the objects to be weighed in the first direction and in the second direction alternately in the second discharge process repeatedly performed by the control means.

14. The combination weigher according to claim 11, wherein the collecting discharge means further includes two lower collecting hoppers which are provided at discharge outlets of the first and second lower collecting chutes and are configured to hold the objects to be weighed which have been discharged from the lower collecting chutes and to discharge the objects to be weighed.

15. The combination weigher according to claim 5, wherein
the upper collecting hoppers are configured to selectively discharge the objects to be weighed in a first direction or in a second direction;
the collecting discharge means includes second to p-th (p: integer of four or larger) plural-stage collecting chutes which are disposed below a first-stage collecting chute consisting of the upper collecting chutes, and collecting hoppers which are respectively provided at discharge outlets of bottom parts of second to (p−1)-th stage collecting chutes and are configured to hold the objects to be weighed which have been discharged from the discharge outlets at the bottom parts of the collecting chutes and to then discharge the objects to be weighed; wherein a q-th (q: integer in a range of 2 to p) stage collecting chute is configured to gather the objects to be weighed which have been discharged from the collecting hoppers provided at discharge outlets of the (q−1)-th stage plural collecting chutes and to discharge the objects to be weighed from a discharge outlet at a bottom part thereof; and the second to p-th stage collecting chutes are disposed to form a first discharge path through which the objects to be weighed which have been discharged in the first direction from the upper collecting hoppers are introduced to a first packaging machine feed inlet and a second discharge path through which the objects to be weighed which have been discharged in the second direction from the upper collecting hoppers are introduced to a second packaging machine feed inlet;
and wherein the control means is configured to cause the upper collecting hoppers to discharge the objects to be weighed in the first direction and in the second direction alternately in the second discharge process performed repeatedly.

16. The combination weigher according to claim 5, wherein
the collecting discharge means includes second to p-th (p: integer of four or larger) plural-stage collecting chutes which are disposed below a first-stage collecting chute consisting of the upper collecting chutes, and collecting hoppers which are provided at discharge outlets of bottom parts of second to (p−1)-th stage collecting chutes and are configured to hold the objects to be weighed which have been discharged from discharge outlets at bottom parts of the collecting chutes and to then discharge the objects to be weighed; wherein in the plural-stage collecting chutes, a q-th (q: integer in a range of 2 to p) stage collecting chute is configured to gather the objects to be weighed which have been discharged from the collecting hoppers provided at discharge outlets of the (q−1)-th stage plural collecting chutes and to discharge the objects to be weighed from a discharge outlet at a bottom part thereof; a k-th (k: one integer in a range of 2 to p−1) stage collecting hopper provided at a discharge outlet of the k-th stage collecting chute is configured to discharge the objects to be weighed selectively in the first direction or in the second direction; and (k+1)-th to p-th stage collecting chutes are disposed to form a first discharge path through which the objects to be weighed which have been discharged in the first direction from the k-th stage collecting hopper are introduced to the first packaging machine feed inlet and a second discharge path through which the objects to be weighed which have been discharged in the second direction from the k-th collecting hopper are introduced to the second packaging machine feed inlet; and
wherein the k-th stage collecting hopper is configured to discharge the objects to be weighed in the first direction and in the second direction alternately in the second discharge process repeatedly performed by the control means.

17. The combination weigher according to claim 15, wherein the collecting discharge means further includes a collecting hopper which is provided at a discharge outlet of the p-th stage collecting chute and is configured to discharge the objects to be weighed which have been discharged from the discharge outlet of the p-th stage collecting chute and to then discharge the objects to be weighed.

18. The combination weigher according to claim 1, the control means is configured to perform the combination calculation based on weights of objects to be weighed which are held by combination hoppers which are not selected to form a discharge combination determined in a previous combination process, in a subsequent combination process in n (n: predetermined plural number)

times of successive combination processes resulting from repeating the combination process.

19. The combination weigher according to claim 1, wherein the control means is configured to determine the discharge combination such that the discharge combination includes combination hoppers belonging to at least two combination hopper groups.

20. The combination weigher according to claim 1, wherein
the control means is configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; and wherein
the upper collecting chutes are configured so that a time taken from when the combination hoppers belonging to the discharge combination determined in the combination process start to discharge the objects to be weighed until all the objects to be weighed which have been discharged are fed to the upper collecting hoppers through the upper collecting chutes is within a time which is 1.1 times as long as 1/k of the ideal weighing cycle time.

21. The combination weigher according to claim 6,
wherein the collecting discharge means further includes a lower collecting hopper which is provided at a discharge outlet of the lower collecting chute and is configured to hold the objects to be weighed which have been discharged from the discharge outlet of the lower collecting chute and to then discharge the objects to be weighed;
wherein the control means is configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein
the upper collecting chutes are configured so that a time taken from when the combination hoppers belonging to the discharge combination determined in the combination process start to discharge the objects to be weighed until all the objects to be weighed which have been discharged are fed to the upper collecting hoppers through the upper collecting chutes is within a time which is 1.1 times as long as 1/k of the ideal weighing cycle time; and wherein
the lower collecting chute is configured so that a time taken from when the upper collecting hoppers start to discharge the objects to be weighed until all the objects to be weighed which have been discharged are fed to the lower collecting hopper through the lower collecting chute is within a time which is 1.1 times as long as 1/k of the ideal weighing cycle time.

22. The combination weigher according to claim 7,
wherein the collecting discharge means further includes a lower collecting hopper which is provided at a discharge outlet of the lower collecting chute and is configured to hold the objects to be weighed which have been discharged from the discharge outlet of the lower collecting chute and to then discharge the objects to be weighed;
wherein the control means is configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein
the upper collecting chutes are configured so that a time taken from when the combination hoppers belonging to the discharge combination determined in the combination process start to discharge the objects to be weighed until all the objects to be weighed which have been discharged are fed to the upper collecting hoppers through the upper collecting chutes is within a time which is 1.1 times as long as 1/k of the ideal weighing cycle time;
the intermediate collecting chutes are configured so that a time taken from when the upper collecting hoppers start to discharge the objects to be weighed until all the objects to be weighed which have been discharged are fed to the intermediate collecting hoppers through the intermediate collecting chutes is within a time which is 1.1 times as long as 1/k of the ideal weighing cycle time; and
the lower collecting chute is configured so that a time taken from when the intermediate collecting hoppers start to discharge the objects to be weighed until all the objects to be weighed which have been discharged are fed to the lower collecting hopper through the lower collecting chute is within a time which is 1.1 times as long as 1/k of the ideal weighing cycle time.

23. The combination weigher according to claim 9,
wherein the collecting discharge means further includes a collecting hopper which is provided at a discharge outlet of the p-th stage collecting chute and is configured to hold the objects to be weighed which have been discharged from the discharge outlet of the p-th stage collecting chute and to then discharge the objects to be weighed;
wherein the control means is configured to perform a series of processes repeatedly, the series of processes including the combination process, the first discharge process, and the second discharge process, once in every 1/k (k: 1 or plural) time of an ideal weighing cycle time in which after the combination hoppers belonging to the discharge combination determined in the combination process start to discharge the objects to be weighed, subsequently the combination hoppers belonging to the discharge combination are fed with the objects to be weighed, thereafter a subsequent combination process is performed using at least weights of the objects to be weighed which are held in the combination hoppers belonging to the discharge combination, and a discharge combination is determined in the subsequent combination process; wherein the first-stage collecting chute is configured so that a time taken from when the combination hoppers belonging to the discharge combination determined in the combination process start to discharge the objects to be weighed until all the objects to be weighed which have been discharged are fed to the upper collecting hoppers through the first-stage collecting chute is within a time which is 1.1 times as long as 1/k of the ideal weighing cycle time; and the q-th stage collecting chute is configured so that a time taken from when the collecting hopper provided at the discharge outlet of the (q−1)-th stage collecting chute start to discharge the objects to be weighed until all the objects to be weighed which have been discharged are fed to the collecting hopper provided at the discharge outlet of the q-th stage collecting chute through the q-th stage collecting chute is within a time which is 1.1 times as long as 1/k of the ideal weighing cycle time.

24. The combination weigher according to claim 1, wherein the combination hopper groups are formed by a plurality of hopper lines into which a combination hopper line including the plurality of combination hoppers arranged annularly is divided.

25. The combination weigher according to claim 1, wherein the combination hopper groups are formed by a plurality of linear-shaped hopper lines into which a combination hopper line including the plurality of combination hoppers arranged in one linear-line shape or in plural linear-line shape is divided.

* * * * *

UNITED STATES PATENT AND TRADEMARK OFFICE
CERTIFICATE OF CORRECTION

| | | |
|---|---|---|
| PATENT NO. | : 8,247,710 B2 | Page 1 of 1 |
| APPLICATION NO. | : 12/374605 | |
| DATED | : August 21, 2012 | |
| INVENTOR(S) | : Shozo Kawanishi | |

It is certified that error appears in the above-identified patent and that said Letters Patent is hereby corrected as shown below:

On the Title Page:

<u>item (75) Inventor:</u>

Line 1 Please delete "Shozo Kawanishi, Nishinomiya (JP)" and replace with -- Shozo Kawanishi, Nishinomiya-shi (JP) --.

<u>item (73) Assignee:</u>

Please delete "(73) Assignee: Shozo Kawanishi, Nishinomiya-shi (JP)".

Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,247,710 B2                                        Page 1 of 1
APPLICATION NO.   : 12/374605
DATED             : August 21, 2012
INVENTOR(S)       : Shozo Kawanishi It is certified that error appears in the above-identified patent and that said Letters Patent is hereby corrected as shown below:

On the Title Page:

"item (75)" should read -- item (76) --.

Signed and Sealed this
Sixteenth Day of February, 2016

Michelle K. Lee
*Director of the United States Patent and Trademark Office*